United States Patent
Morimoto et al.

(10) Patent No.: US 7,338,217 B2
(45) Date of Patent: Mar. 4, 2008

(54) FUNCTIONAL OPTICAL MODULE

(75) Inventors: Masahito Morimoto, Tokyo (JP); Kouki Sato, Tokyo (JP); Masato Shiino, Tokyo (JP); Hajime Kazami, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 11/352,176

(22) Filed: Feb. 10, 2006

(65) Prior Publication Data

US 2006/0140544 A1    Jun. 29, 2006

Related U.S. Application Data

(62) Division of application No. 10/269,499, filed on Oct. 11, 2002, now Pat. No. 7,040,814.

(30) Foreign Application Priority Data

| Oct. 15, 2001 | (JP) | ............................. 2001-317347 |
| Nov. 8, 2001 | (JP) | ............................. 2001-343009 |
| Feb. 7, 2002 | (JP) | ............................. 2002-30614 |
| Feb. 13, 2002 | (JP) | ............................. 2002-35734 |

(51) Int. Cl.
*G02B 6/36* (2006.01)

(52) U.S. Cl. ............................. 385/88; 385/27; 385/92; 385/33

(58) Field of Classification Search .................. 385/88
See application file for complete search history.

(56) References Cited

U.S. PATENT DOCUMENTS

| 4,668,044 | A | * | 5/1987 | D'Auria et al. ............... 385/92 |
| 5,281,301 | A | | 1/1994 | Basavanhally |
| 5,548,677 | A | | 8/1996 | Kakii et al. |
| 5,719,978 | A | | 2/1998 | Kakii et al. |
| 5,764,833 | A | | 6/1998 | Kakii et al. |
| 5,917,976 | A | | 6/1999 | Yamaguchi |
| 6,334,716 | B1 | | 1/2002 | Ojima et al. |
| 6,386,768 | B1 | * | 5/2002 | Yoon et al. ................... 385/88 |
| 6,411,753 | B1 | | 6/2002 | Ao |
| 6,422,761 | B1 | | 7/2002 | Naghski et al. |
| 6,526,205 | B1 | | 2/2003 | Wilson et al. |
| 6,530,700 | B2 | | 3/2003 | Williams |
| 6,634,800 | B2 | | 10/2003 | Suematsu et al. |
| 6,739,760 | B2 | | 5/2004 | Cheng et al. |

* cited by examiner

*Primary Examiner*—Frank G. Font
*Assistant Examiner*—Mary El-Shammaa
(74) *Attorney, Agent, or Firm*—Cantor Colburn LLP

(57) ABSTRACT

There are provided a power supply device for an optical functional component that supplies power to the optical functional component with reliability for a long term and enables easy exchange of the optical functional component, and an optical functional module having such a power supply device, where the power supply device is provided with a reception electrode 104, a power supply electrode 107-1 that supplies power to the reception electrode 104 while holding tight the reception electrode 104 on its side faces and thereby holding an optical functional component 105-1 detachably, and a protecting member 108 that is made of an insulating material and surrounds the power supply electrode 107-1 to prevent current leaks, and the power supply electrode 107-1 is comprised of two bent metallic members (107-1a and 107-1B) which are in intimate contact with the reception electrode 104 by elasticity.

4 Claims, 24 Drawing Sheets

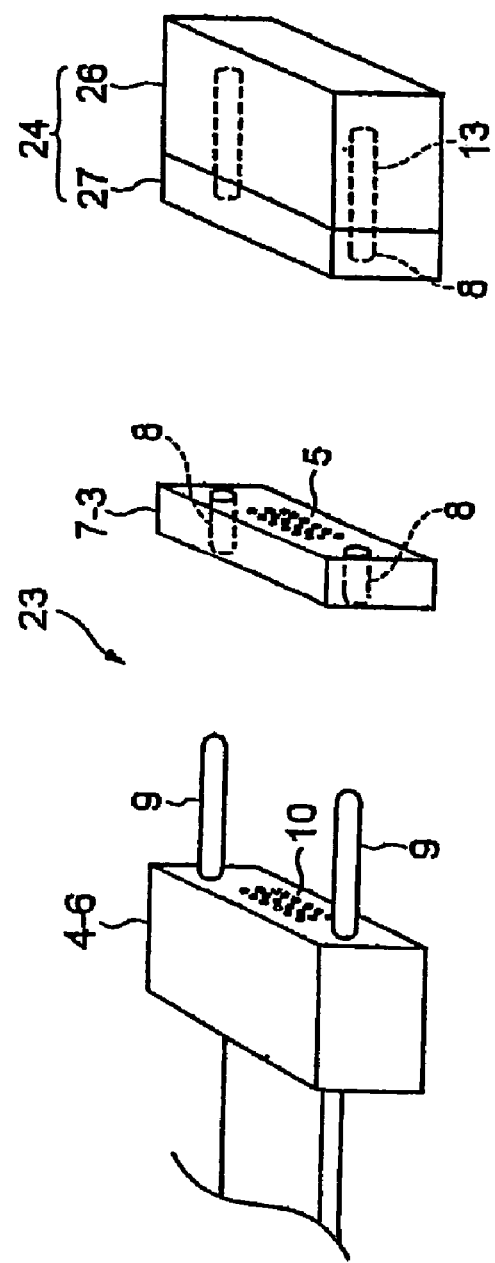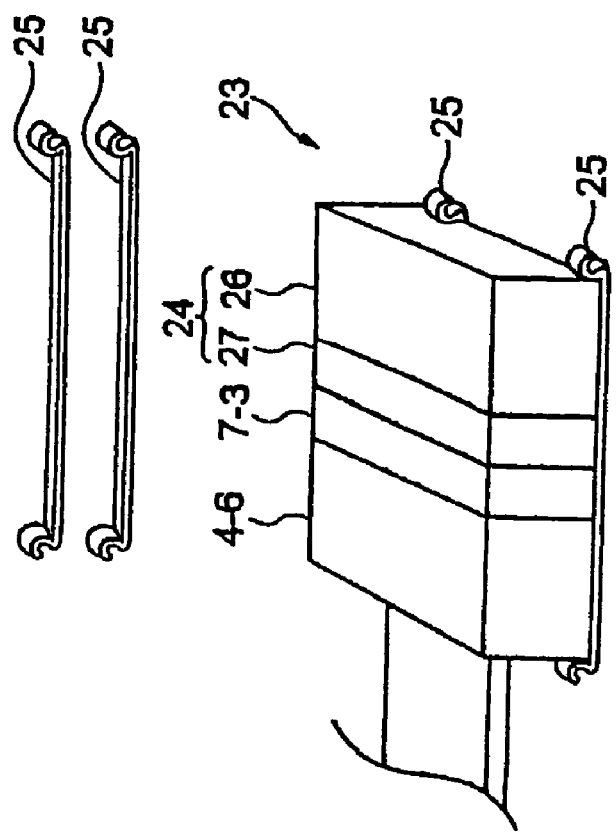
FIG. 1-8A
FIG. 1-8B

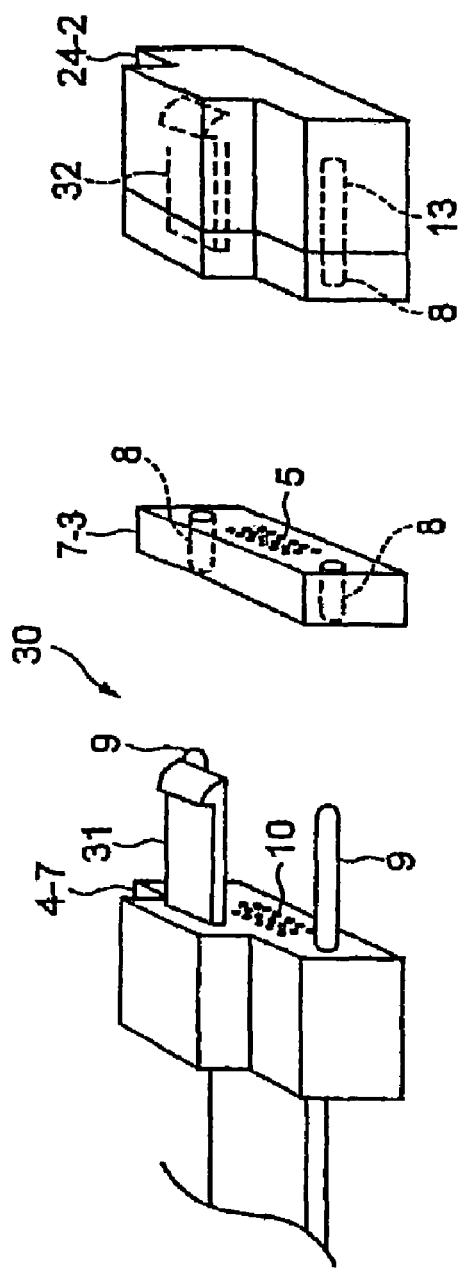
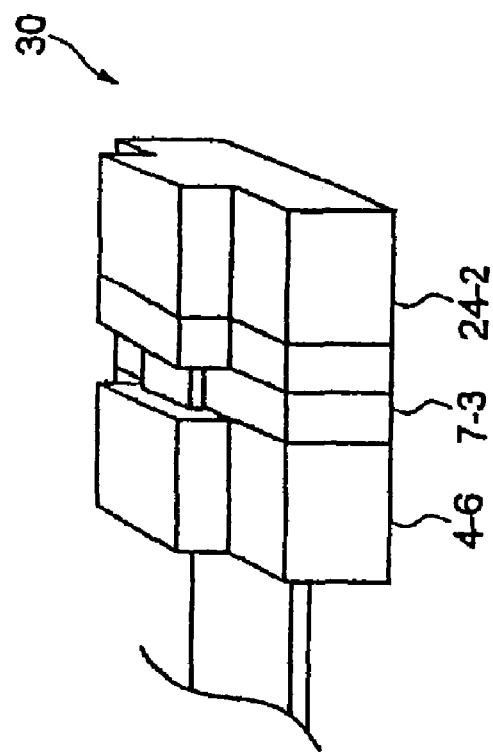
FIG. 1-10A
FIG. 1-10B

FUNCTIONAL OPTICAL MODULE

CROSS REFERENCE TO RELATED APPLICATION

This application is a divisional application of U.S. patent application Ser. No. 10/269,499, filed on Oct. 11, 2002, now U.S. Pat. No. 7,040,814, the content of which is incorporated by reference herein in their entirety.

FIELD OF THE INVENTION

The first invention relates to a functional optical module having a ferrule that holds an optical fiber used in optical communications or the like, a collimator provided in contact with the ferrule, and an optical functional component that exerts a predetermined effect on a collimated light beam.

The second invention relates to a power supply device for an optical functional component that exerts a predetermined effect on a light beam, and an optical functional module provided with the power supply device.

The third invention relates to an optical switch used in, for example, optical path switching in an optical communication field.

DESCRIPTION OF THE RELATED ART (First Invention)

FIG. 1-11 is a schematic view of a conventional functional optical module 100. In addition, the functional optical module 100 is provided with a variable optical attenuator as an optical functional component, but to facilitate explanations, only an optical absorptive filter 101 that attenuates the light is illustrated with driving components or others for driving the filter omitted.

The optical absorptive filter 101 is an optical absorptive member having a thickness gradient in the longitudinal direction viewed in the figure, is disposed in the direction perpendicular to a light beam 103 output from a collimator 102-1 connected with an optical fiber, travels in the direction of an arrow A or B, changes an absorbance coefficient of the light beam 103, and thereby attenuates the optical beam. The optical beam 103 attenuated by the optical absorptive filter 101 is input to a collimator 102-2.

To obtain a parallel arrangement of collimators, for example, a V-shaped groove for fiber guide is provided on a silicon substrate or glass substrate, and on the groove an optical fiber collimator is disposed which is obtained by fusion-splicing an SM (Single Mode) fiber in its front end with a GI (Graded Index) fiber with a predetermined length and thereby is provided with the lens function.

(Second Invention)

FIG. 2-12 is a perspective view of a conventional optical functional module 800.

The conventional optical functional module 800 has a collimator 802 connected to an optical fiber 801, an optical functional component 803, and a housing 804 that holds the collimator 802 and optical functional component 803. In addition, this embodiment illustrates the case of using a photodiode, as the optical functional component 803, which converts light emitted from the collimator 802 into an electric signal.

To supply the power to the optical functional component 803, in general a reception electrode 805 provided on an upper surface of the optical functional component 803 is bonded with a poser supply electrode 806 provided on the housing 804 using fine wiring 807, and the power supply electrode 806 is connected with an external power supply (not shown).

Third Embodiment

With the advent of the broad-band era, increases in data transmission amount are further required. Then, optical communications allowing large-capacity data transmission have been applied widely to local areas, companies, personal use and so on, in addition to optical fiber subscriber networks.

Thus applying optical communications to various channel networks increases the importance of an optical switch indispensable to, for example, optical path switching in intra-channel or between-channel and channel switching under fault conditions.

As a conventional optical switch, for example, a switch is disclosed in which using a Micro-Electro Mechanical System (MEMS) technique, a micro mirror is moved up and down on a silicon substrate, a light beam is reflected by the mirror moving up and down, and thereby optical paths are switched (1999 IEICE Conference, C-3-144).

Further, as a switch (hereinafter referred to as a 2×2 optical switch) having two inputs and two outputs of optical signals, an optical switch is disclosed in which a micro mirror is loaded and unloaded at an intersection where a plurality of optical fibers crosses at a 90-degree angle and thereby an optical path is changed (for example, IEEE Photonics Technology Letters, Vol. 11, No. 11, November 1999, pages 1396-1398 and Journal of Lightwave Technology, Vol. 17, No. 1, January 1999, pages 2-6.)

Furthermore, a switch is disclosed in which four fiber collimators each with a GI (Graded Index) fiber fusion-spliced in its front end are disposed on four V-shaped grooves respectively on a silicon substrate, a reflector disposed at an incident light output side of the fiber collimator is moved up and down by magnetic force of a permanent magnet, electromagnet or the like, and the reflector moving up and down switches an optical path of the light beam incident through the fiber collimator (see Japanese Laid-Open Patent Publication 2000-98270).

Moreover, there is disclosed a switch in which an intersection of optical paths is provided on a waveguide, and a waveguide type refractive index matching member is loaded and unloaded at the intersection, and thereby optical paths are switched (Journal of Lightwave Technology, Vol. 17, No. 1, January 1999, pages 14-18).

OBJECT OF THE INVENTION (First Invention)

However, following problems exist in using the above-mentioned conventional collimator, optical functional component, and functional optical module provided with the collimator and component in a DWDM (Dense Wavelength Division Multiplexing) communication scheme.

First, when conventional optical functional components are used in each wavelength in the DWDM communication scheme, the number of components is estimated to exceed 100. In this case, since a single optical functional component has a size to some extent, the entire device occupies an enormously large capacity. With respect to an AWG (Array Wave Guide Grating) wavelength division multiplexing device, although various components are integrated on a single chip, the device is a few cm in length currently, and has problems with its capacity.

Further, in the case of an optical connector such that fiber guides are provided in parallel on a chip produced using a semiconductor production technique, it is difficult to attach an optical fiber to a fiber guide. Moreover, it is required to carefully handle an optical fiber removed from a chip to prevent occurrences of breakage and insertion loss of optical fiber in assembly.

In order to permanently prevent such occurrences of breakage and addition loss of optical fiber, it is required to provide a protecting member such as a housing to protect components from dusts in the air, resulting in problems that production processes become more complicated and production facilities are upsized. The AWG wavelength division multiplexing device has also has such problems; it is difficult to connect each waveguide and an optical fiber and handle the optical fiber.

Further, in the case of placing optical fibers on the V-shaped groove, it is necessary to provide on the substrate a through hole for fixing a lens in the direction toward the outside from an end portion of the V-shaped groove. In this case, for conveniences in arrangement of optical fiber and lens, a size of the lens is limited to within a pitch of the V-shaped groove. Furthermore, low dimensional accuracy of a lens causes deviations in position and direction of an optical axis of a light beam, thus disabling predetermined functions.

The above problems do not arise in using the above-mentioned optical fiber collimator composed of an SM fiber with a GI fiber fusion-spliced in its front end, but such an optical fiber collimator has following problems.

Optical functional components have different optical properties with types. For example, in the case of a laser light emitting device, when optical properties of a laser light emitting device are not coincident with optical properties of a lens, the optical function is not exhibited properly, nor predetermined effects are not obtained. Accordingly, the exchange of an optical functional component with another one may require concurrent exchange of a lens having optical properties matching those of the optical functional component.

In the optical collimator, as described above, since a lens and optical fiber is fusion-spliced, it is impossible to exchange only the lens. Exchanging the lens requires fusion-splicing a lens again with the optical fiber. This process includes complicated operations such as removing a protecting member and aligning an optical axis of optical fiber, puts an enormous load on its supplier in cost, facilities and operation efficiency, and is virtually impossible to execute.

In view of the foregoing, it is an object of the first invention to provide a collimator, compact in size and excellent in durability, enabling only an optical functional component to be performed readily when exchange of a lens is not required, further enabling exchange of the lens and of the optical functional component to be performed promptly and readily when exchange of the lens is required, furthermore enabling exchange of a lens, and further provide such an exchange type of a functional optical module.

(Second Invention)

However, there have been following problems with the above-mentioned conventional technique.

First, since the reception electrode of the optical functional component and the power supply electrode of the housing are connected by boding, when the need arises of exchanging the optical functional component with another optical functional component with a different function, it is necessary to open the housing, remove the bonded wires, dispose a new optical functional component, and perform bonding again, and thus an enormous load is put on its supplier.

Further, since the reception electrode is provided on a surface of the substrate of the optical functional component, the surface needs to oppose to a capillary for bonding to perform bonding to the optical functional component. Furthermore, a general capillary for bonding is configured to operate upwardly and downwardly, which results in that the reception electrode is provided upwardly, and it is difficult to produce a sideward optical functional component.

In solve this problem, it is considered to provide a reception electrode on a side face of an optical functional component. However, since optical functional components are produced collectively on a semiconductor wafer every a few tens to thousands of components and dicing the wafer obtains each component, each component does not have side faces before undergoing dicing. In other words, since the side face is formed only after dicing, providing a reception electrode on a side face of each component requires an apparatus and process for providing an electrode on a side face of each component after dicing.

However, electrode formation in the semiconductor production process is generally performed by deposition or sputtering, and in order to form a reception electrode on a side face of each component by the deposition or sputtering, a step of rearranging a number of components is necessary so that a side face of each of the components becomes a target for the deposition or sputtering, which puts an enormous load on the supplier in cost, apparatus and process, and is virtually impossible to implement.

Further, it is necessary to fix wiring to the electrode with reliability in attaching the wiring by bonding, and heating the electrode and/or ultrasonic irradiation is performed.

However, the component sensitive to heat and/or vibration restricts heating condition and/or ultrasonic condition, and there arises a case that the electrode cannot be fixed with reliability.

Further, since the wiring for use in boding is generally composed of a fine metal line with approximately few μm, a break may occur in the wiring due to fine dusts, dirt and/or wind. Therefore required is that a housing accommodating the optical functional component is vacuum-sealed.

In view of the foregoing, it is an object of the second invention to provide a power supply device for an optical functional component that supplies power to the optical functional component with reliability for a long term and enables easy exchange of the optical functional component, and an optical functional module having such a power supply device.

(Third Invention)

The conventional mirror moving type of optical switch has following problems.

First, it is very difficult to connect an optical fiber and the switch. For example, in the method of moving a mirror on a substrate, since a light beam is reflected by the mirror, it is required to enhance accuracy in arrangement of the optical fiber and mirror. Therefore, the switch is often provided with a V-shaped groove on which an optical fiber is placed.

In the optical switch using a V-shaped groove, an optical fiber is not fixed when placed on the V-shaped groove, and after placing the optical fiber on the V-shaped groove, the V-shaped groove is covered and thus the optical fiber is fixed. However, there is a risk that the optical fiber escapes from the V-shaped groove when the V-shaped groove is covered, and highly precise assembly is required.

Second, in the conventional mirror moving type of optical switch, an optical path of a light beam is switched by mirror reflection and transmission. Therefore, an optical fiber at a light-beam input side and an optical fiber at a light-beam output side are spaced perpendicularly (90°) to each other. In particular, in a 2×2 optical switch, optical fibers extend in four directions perpendicular to one another around the switch, resulting in an upsized optical switch.

Third, in the conventional mirror moving type of optical switch, since it is necessary to precisely guide a light beam to each of the optical fibers at input and output sides, each of the optical fibers at input and output sides is fusion-spiced in its front end at a light-beam output side with a GI fiber and thus the optical fibers at input and output sides are used as fiber collimators, or respective end faces of optical fibers at input and output sides are disposed closely to each other as possible.

However, when a fiber collimator is used, the fusion may cause fluctuations in refractive index distribution of a GI fiber, and it is not possible to obtain a desired form for characteristics of collimator, thus resulting in increased insertion loss.

Further, in a configuration in which respective end faces of optical fibers at input and output sides are disposed closely to each other as possible, in order to implement a low loss to the extent of practical use, a distance between the end faces of the fibers needs to be within a few tens μm. To implement such a distance between the end faces, it is necessary to provide the fiber with a specialized process to taper a front end of the fiber, and thus the extremely complicated process is required.

Meanwhile, in the optical switch disclosed in JP 2000-98270, in addition to the problems in the assembly caused by supporting an optical fiber on a V-shaped groove, and in fluctuations in refractive index caused by fusion-splicing of a GI fiber, a reflector moving device such as a permanent magnet or electromagnet is required separately and externally from main portions (fiber collimator and reflective plate) of the switch, thus upsizing the optical switch.

Further, in the optical switch disclosed in JP 2000-98270, its configuration makes it difficult to align the fiber collimator and reflector, and there arises a risk of introducing an optical loss. Furthermore, as described above, since there are a large number of parts composing the optical switch which are provided independently of each other, complicated assembly and alignment adjustments for the parts are needed.

Then, in the conventional optical switch with a configuration in which a waveguide type refractive index matching member is inserted and removed at an intersection portion of waveguides, there are problems that the operation speed is low and thus the practicality is low, and that a coupling loss of optical fibers of a rectangle waveguide and of a circular waveguide is increased as compared to a coupling loss of circular waveguides (optical fibers) and thus the practicality deteriorates.

In view of the foregoing, it is an object of the third invention to provide an optical switch compact in size and greatly easy in handling and assembly.

DISCLOSURE OF INVENTION (First Invention)
Embodiments of the first invention will be disclosed below.

A first embodiment of the first invention is a functional optical module which comprises:
 (a) a first ferrule that holds at least one optical fiber;
 (b) a lens unit that is capable of coming into contact with the ferrule and holds a collimator lens;
 (c) an optical functional component that is capable of coming into contact with the lens unit and exerts a predetermined effect on a light beam incident from the optical fiber of the ferrule;
 (d) a second ferrule that is capable of coming into contact with the optical functional component and holds at least one optical fiber; and
 (e) integrating means for integrally combining the first ferrule, the second ferrule, the lens unit and the optical functional component, while aligning ferrules, the unit and the component.

A second embodiment of the first invention is a functional optical module further comprising a lens unit that is provided between the optical functional component and the second ferrule and holds a collimator lens.

A third embodiment of the first invention is a functional optical module in which the lens unit and the ferrule are integrally formed.

A fourth embodiment of the first invention is a functional optical module in which a light beam output from the collimator lens is a collimated light beam with a spread degree of within ±2°, and a thickness of the optical functional component that exerts a predetermined effect on the collimated light beam is less than or equal to twice a focal length of the collimator lens.

A fifth embodiment of the first invention is a functional optical module in which the collimator lens has a refractive index with an approximately square distribution with respect to a center of the lens.

A sixth embodiment of the first invention is a functional optical module in which the collimator lens has anti-reflection coating on an end face portion at its one side or both sides.

A seventh embodiment of the first invention is a functional optical module in which the collimator lens is made of a graded index fiber.

An eighth embodiment of the first invention is a functional optical module in which the optical functional component is an optical attenuator.

A ninth embodiment of the first invention is a functional optical module in which the optical attenuator is an attenuator provided with a light shield plate adjustable in position with respect to a light beam.

A tenth embodiment of the first invention is a functional optical module in which the optical attenuator is plate-shaped metallic silicon with a sputtered metal thin film.

An eleventh embodiment of the first invention is a functional optical module in which the optical attenuator is a liquid crystal plate capable of adjusting incident light.

A twelfth embodiment of the first invention is a functional optical module in which the optical attenuator is a dielectric multilayer film.

A thirteenth embodiment of the first invention is a functional optical module in which the integrating means is comprised of a guide pin which is fixed to one of the ferrules and engages in a through hole provided in each of the lens unit, the optical functional component, the other lens unit, and/or the other one of the ferrules.

A fourteenth embodiment of the first invention is a functional optical module in which the integrating means is further provided with a clip member that brings the ferrules, lens unit and the optical functional component into intimate contact with one another.

A fifteenth embodiment of the first invention is a functional optical module in which the integrating means is further provided with a latch portion which is provided in one of the ferrules and engages in an engaging portion provided in the lens unit, the optical functional component or the other one of the ferrules.

A sixteenth embodiment of the first invention is a functional optical module which comprises:
(a) a ferrule that holds at least one optical fiber;
(b) a lens unit that is capable of coming into contact with the ferrule and holds a collimator lens;
(c) an optical functional component capable of coming into contact with the lens unit; and
(d) integrating means for integrally combining and aligning the ferrule, the lens unit and the optical functional component.

A seventeenth embodiment of the present invention is a functional optical module in which the optical functional component is a surface-emitting laser device.

An eighteenth embodiment of the first invention is a functional optical module in which a light beam output from the collimator lens is a collimated light beam with a spread degree of within ±2°.

A nineteenth embodiment of the first invention is a functional optical module in which the collimator lens has a refractive index with an approximately square distribution.

A twentieth embodiment of the first invention is a functional optical module in which the collimator lens is made of a graded index fiber.

A twenty-first embodiment of the first invention is a functional optical module in which the integrating means is comprised of a guide pin which is fixed to the ferrule and passes through a through hole provided in the lens unit.

A twenty-second embodiment of the first invention is a functional optical module in which the integrating means is further provided with a latch portion which is provided in the ferrule and engages in an engaging portion provided in the lens unit, the optical functional component or another ferrule.

(Second Invention)

A first embodiment of the second invention is a power supply device for an optical functional component which comprises:
(a) a reception electrode provided on a surface of the optical functional component; and
(b) a power supply electrode that supplies power to the reception electrode while holding tight the reception electrode on its side faces and thereby holding the optical functional component detachably.

A second embodiment of the second invention is a power supply device for an optical functional component further provided with a protecting member that is made of an insulating material and surrounds the power supply electrode to prevent current leaks.

A third embodiment of the second invention is a power supply device for an optical functional component in which the power supply electrode is provided with two bent metallic members which are in intimate contact with the reception electrode by elasticity.

A fourth embodiment of the second invention is a power supply device for an optical functional component in which the power supply electrode is provided with a bent metallic member which is in intimate contact with the reception electrode by elasticity.

A fifth embodiment of the second invention is power supply device for an optical functional component in which the power supply electrode is provided with two metallic members and contacting means for bringing the two metallic members into intimate contact with the reception electrode.

A sixth embodiment of the second invention is a power supply device for an optical functional component in which the contacting means is a spring.

A seventh embodiment of the second invention is an optical functional module which comprises:
(a) at least one cable holding member that holds an optical fiber;
(b) an optical functional component that exerts a predetermined effect on light;
(c) a power supply device for the optical functional component provided with a reception electrode provided on a surface of the optical functional component, and a power supply electrode that supplies power to the reception electrode while holding tight the reception electrode on its side faces and thereby holding the optical functional component detachably; and
(d) a housing that secures the cable holding means and the power supply electrode.

An eighth embodiment of the present invention is an optical functional module in which the cable holding member is provided with a collimator lens.

A ninth embodiment of the second invention is optical functional module in which the power supply device for the optical functional component is further provided with a protecting member that is made of an insulating material and surrounds the power supply electrode to prevent current leaks.

A tenth embodiment of the second invention is an optical functional module in which the power supply electrode is provided with two bent metallic members which are in intimate contact with the reception electrode by elasticity.

An eleventh embodiment of the second invention is an optical functional module in which the power supply electrode is provided with a bent metallic member which is in intimate contact with the reception electrode by elasticity.

A twelfth embodiment of the second invention is an optical functional module in which the power supply electrode is provided with two metallic members and contacting means for bringing the two metallic members into intimate contact with the reception electrode.

A thirteenth embodiment of the second invention is an optical functional module in which the contacting means is a spring.

A fourteenth embodiment of the second invention is an optical functional module in which the optical functional component is an MEMS component.

(Third Invention)

A first embodiment of the third invention comprises a connector module having incorporated a plurality of input optical paths for light-beam input and a plurality of output optical paths for light-beam output corresponding to the plurality of input optical paths, a light-beam reflecting member that is accommodated in the connector module and reflects a plurality of light beams incident through the plurality of input optical paths to output to the plurality of output optical paths while switching the output optical paths, and aligning means attached to the connector module for aligning the connector module and the light-beam reflecting member.

In the second embodiment of the third invention, a collimating member is further provided which is attached to the connector module and collimates each of light beams input from the plurality of input optical paths and light beams output to the plurality of output optical paths of the connector, and the aligning means aligns the connector module, the collimator member and the light-beam reflecting member.

In the third embodiment of the third invention, the plurality of input optical paths is composed of a first input optical path and a second input optical path, while the plurality of output optical paths is composed of a first output optical path and a second output optical path, and the light-beam reflecting means has a first reflector that reflects incident light from the first input optical path to the first output optical path, while reflecting incident light from the second input optical path to the second output optical path, and a second reflector that reflects incident light from the first input optical path to the second output optical path, while reflecting incident light from the second input optical path to the first output optical path.

In the fourth embodiment of the third invention, the plurality of input optical paths and the plurality of the output optical paths are formed of a plurality of light-beam input optical fibers and a plurality of light-beam output optical fibers respectively, the connector module is provided with a receptacle having a hollow portion including an opening face, and a connector which secures the plurality of light-beam input optical fibers and the plurality of light-beam output optical fibers with the fibers arranged in parallel with one another and which engages in the hollow portion of the receptacle, and the light-beam reflecting member is accommodated detachably in the hollow portion of the receptacle.

In the fifth embodiment of the third invention, the collimating member has a plurality of collimator lenses provided in coaxial state with respect to the plurality of light-beam input optical fibers and the plurality of light-beam output optical fibers, and a lens connector that holds the collimator lenses and is attached detachably to the connector.

In the sixth embodiment of the third invention, the aligning means is provided with guide pin holes respectively formed in coaxial state in the connector, the lens connector and the light-beam reflecting member, and a guide pin that is inserted into each of the guide pin holes and integrally combines the connector, the lens connector and the light-beam reflecting member.

In the seventh embodiment of the third invention comprises a receptacle having a hollow portion in which a connector detachably engages, the connector having incorporated a plurality of input optical paths for light-beam input and a plurality of output optical paths for light-beam output corresponding to the plurality of input optical paths, a light-beam reflecting member that is accommodated in the hollow portion of the receptacle and reflects a plurality of light beams input through the plurality of input optical paths to output to the plurality of output optical paths while switching the output optical paths, and aligning means for being capable of engaging in the connector and when the connector is engaged, aligning the connector and the light-beam reflecting means.

In the eighth embodiment of the third invention, the receptacle has a fastening hole for latching the connector, and the connector has an engaging portion capable of being engaged and fastened in the fastening hole and engages detachably in the hollow portion of the receptacle using the engaging portion and the fastening hole of the receptacle.

BRIEF DESCRIPTION OF THE DRAWINGS (First Invention)

FIG. 1-1B is a perspective view showing integrally combined lens unit and ferrule;

FIG. 1-2A is perspective view showing a configuration of the functional optical module according to the one embodiment of the first invention;

FIG. 1-2B is a perspective view showing integrally combined all members of FIG. 2A;

FIG. 1-3A is a schematic view of a variable optical attenuator;

FIG. 1-3B is an enlarged view of the variable optical attenuator shown in FIG. 1-3A;

FIG. 1-4 is a view showing a liquid crystal optical attenuator;

FIG. 1-5 is a view showing a dielectric thin film optical attenuator;

FIG. 1-6 is a perspective view of an integrally combined functional optical module;

FIG. 1-7 is a perspective view of a functional optical module integrally combined by a latch member;

FIG. 1-8A is a perspective view of a configuration of a functional optical module provided with a surface-emitting laser of the first invention;

FIG. 1-8B is a perspective view showing integrally combined all members of FIG. 1-8A;

FIG. 1-9A is a perspective view showing a configuration of a surface-emitting laser device;

FIG. 1-9B is an enlarge view of a main body of the device shown in FIG. 1-9A;

FIG. 1-10A is a perspective view showing a configuration of the functional optical module shown in FIG. 1-8A;

FIG. 1-10B is a view showing the functional optical module shown in FIG. 1-10B assembled by a latch; and FIG. 1-11 is a schematic view of a conventional functional optical module 100.

Second Embodiment

Figures 1, 1A:
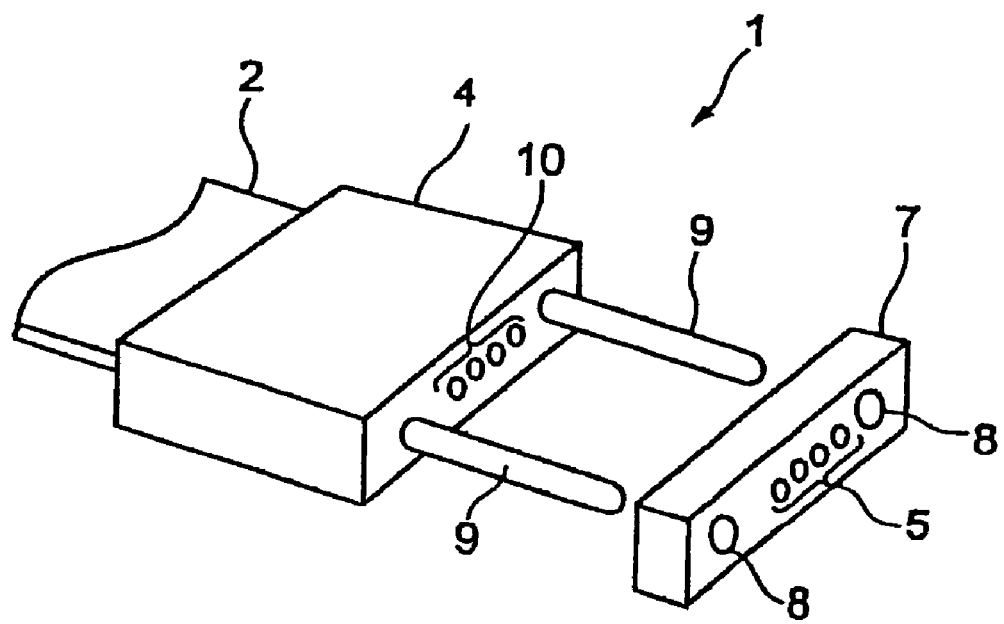
FIG. 1-1A is a perspective view showing part of a configuration of a functional optical module according to one embodiment of the first invention.
Figures 1, 1B:
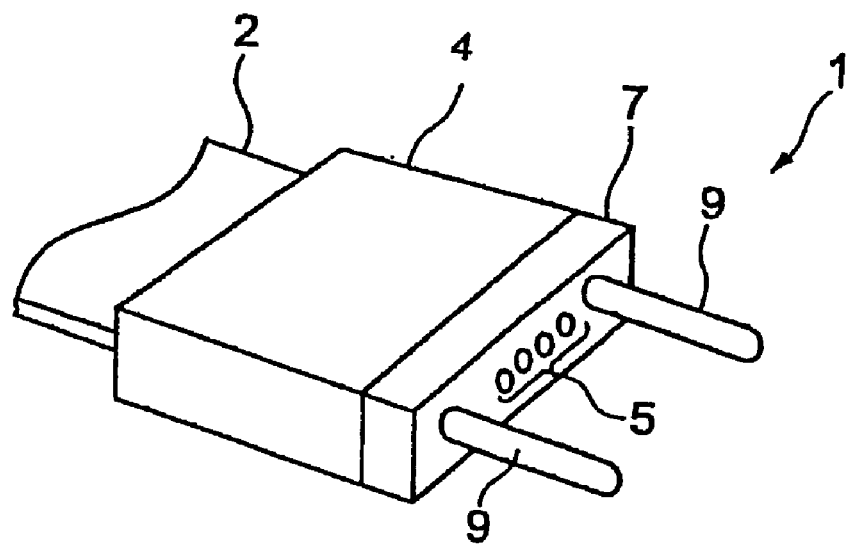
Figures 1, 2, 2A, 2B:
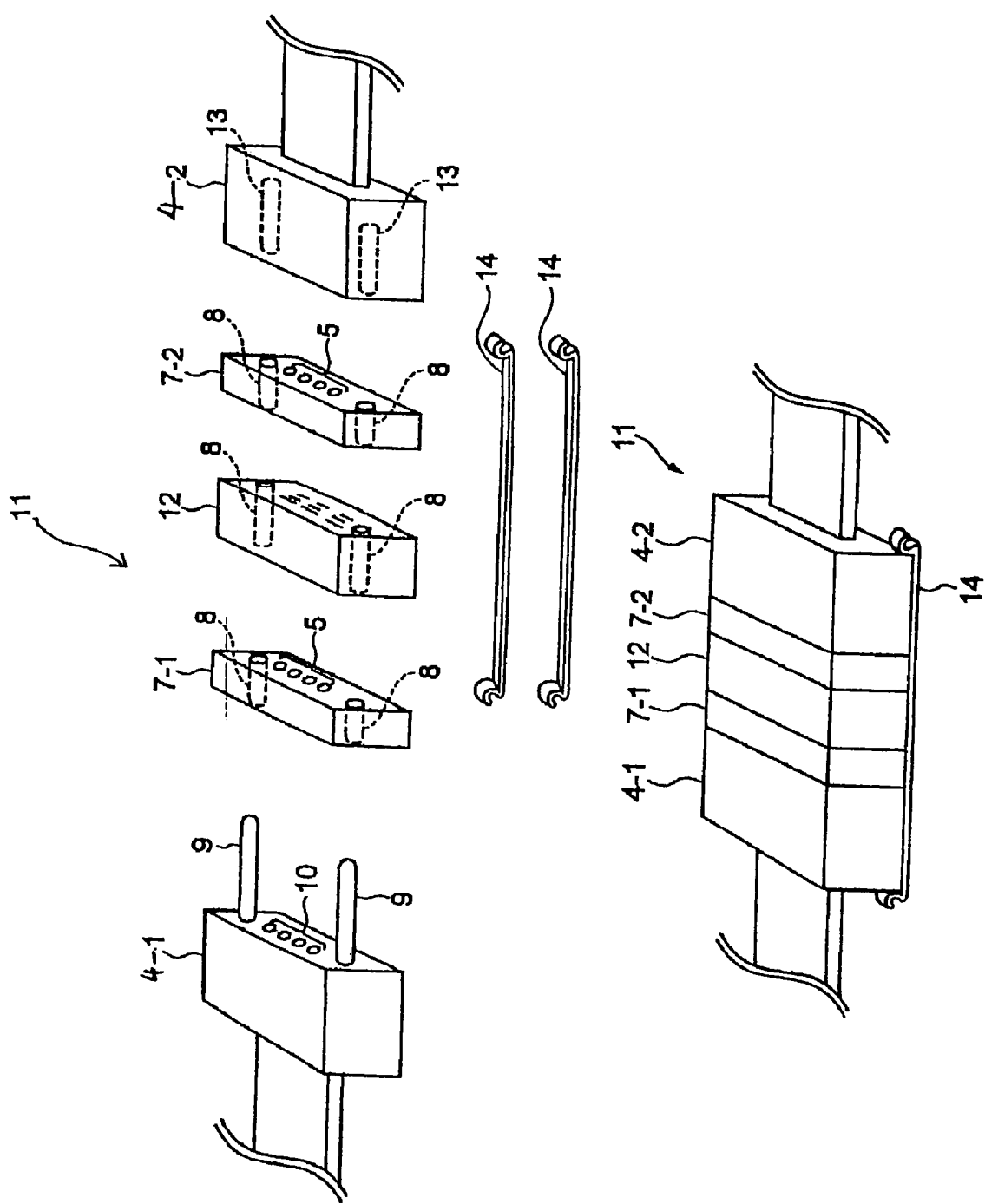
Figures 1, 2, 3, 3A:
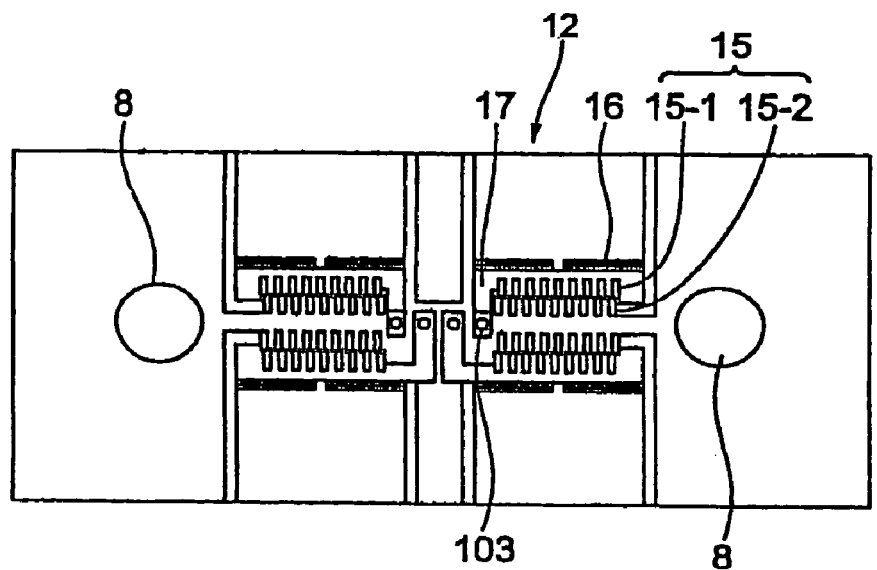
Figures 1, 2, 3, 3B:
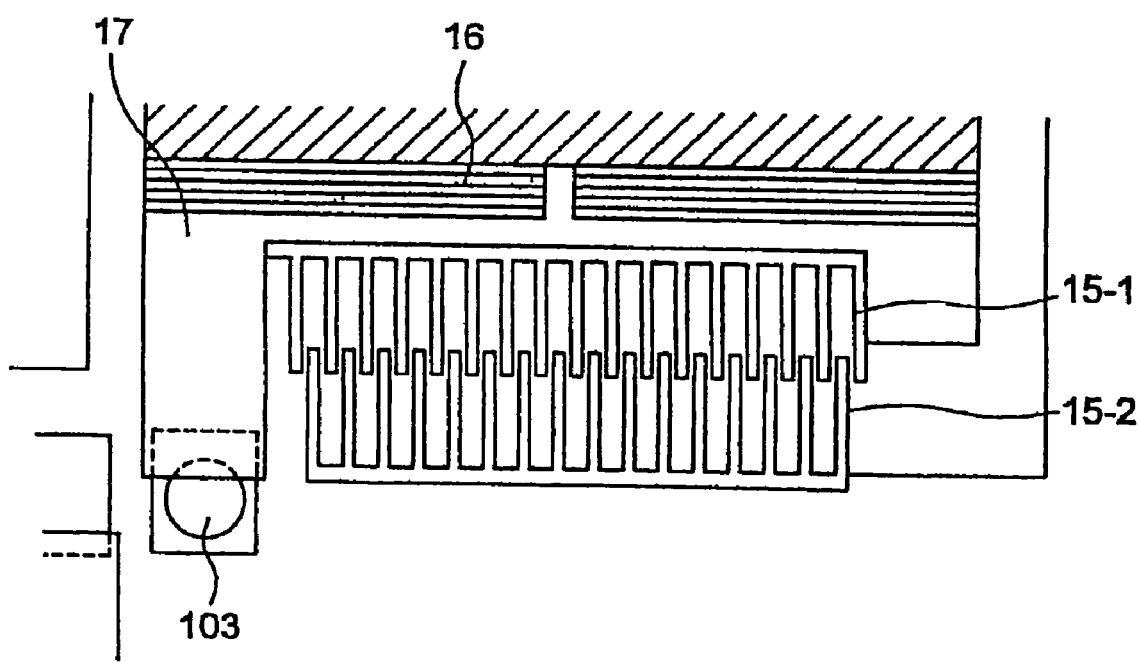
Figures 1, 2, 3, 4:
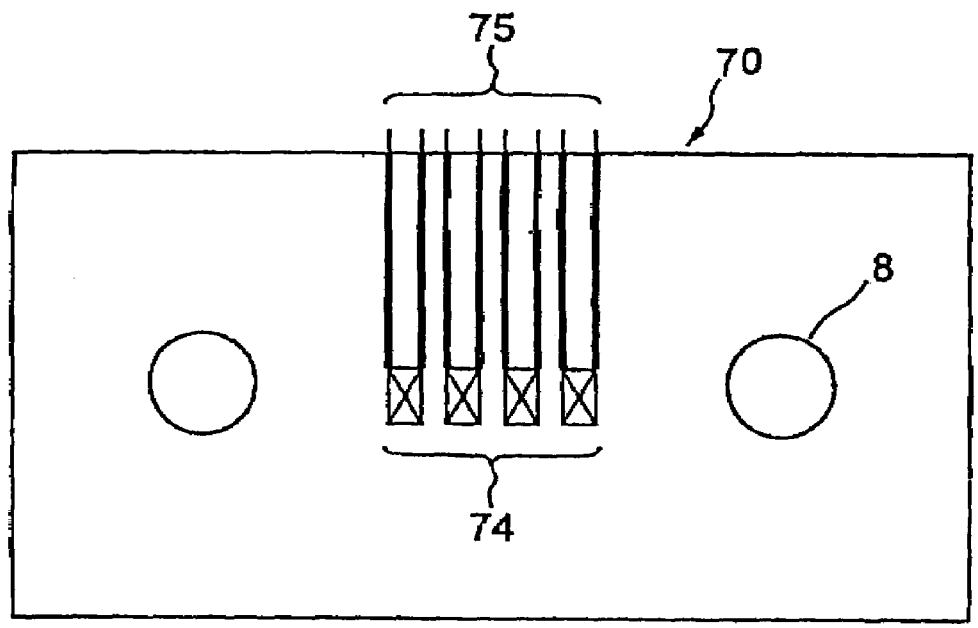

FIG. 2-1 is a perspective view of an optical functional module according to a first embodiment of the second invention;

FIG. 2-2A is an enlarged perspective view of a protecting member and a power supply electrode of FIG. 2-1;

FIG. 2-2B is an enlarged cross-sectional view of the protecting member and the power supply electrode of FIG. 2-1;

FIG. 2-3 is an enlarged perspective view of a photo diode, the protecting member and the power supply electrode of FIG. 2-1;

FIG. 2-4 is a perspective view of an optical functional module according to a second embodiment of the second invention;

FIG. 2-5 is a perspective view of an optical functional module according to a third embodiment of the second invention;

FIG. 2-6A is a perspective view of an optical functional module according to a fourth embodiment of the second invention;

FIG. 2-6B is a front view of an optical attenuator of FIG. 2-6A;

FIG. 2-7 is a perspective view of an optical functional module according to a fifth embodiment of the second invention;

FIG. 2-8 is a perspective view showing primary structural members of the optical functional module of FIG. 2-7;

FIG. 2-9 is a perspective view showing an optical functional component sandwiched between a cable holding member of FIG. 2-8;

FIG. 2-10 is a perspective view of a power supply electrode according to a sixth embodiment of the second invention;

FIG. 2-11 is a perspective view of a power supply electrode according to a seventh embodiment of the second invention; and FIG. 2-12 is a perspective view showing a conventional optical functional module.

(Third Invention)

FIG. 3-1 is a disassembled perspective view showing a schematic configuration of an optical switch according to a first embodiment of the third invention;

FIG. 3-2 is a cross-sectional view taken along the arrowed line II-II of FIG. 3-1;

FIG. 3-3 is a side view containing an opening of a receptacle in which accommodated is a reflecting member shown in FIG. 3-1;

FIG. 3-4 is an enlarged perspective view of the reflecting member shown in FIG. 3-2 and FIG. 3-3.

FIG. 3-5A is a view showing a reflecting portion of the reflecting member shown in FIG. 3-4 to illustrate optical path switching;

FIG. 3-5B is another view showing a reflecting portion of the reflecting member shown in FIG. 3-4 to illustrate optical path switching;

FIG. 3-6 is a perspective view showing a schematic configuration of a reflecting member according to a second embodiment;

FIG. 3-7 is a perspective view showing a schematic configuration of a reflecting portion of a reflecting member according to a third embodiment; and FIG. 3-8 is a perspective view showing a schematic configuration of a reflecting portion of a reflecting member according to a fourth embodiment.

DETAILED DESCRIPTION OF THE PREFERRED EMBODIMENTS (First Invention)

Lens-exchange type collimators and functional optical modules of the first invention will be described below with reference to accompanying drawings.

In addition, following embodiments are illustrative only and are not intended to limit the scope of the first invention. Accordingly, it will be understood that various modifications including each or all the elements may be made by those skilled in the art and that the scope of the first invention includes such modifications.

FIGS. 1-A and 1-B are perspective views each showing a configuration of a collimator 1 comprised of a lens-exchange type collimator lens unit 7 and a ferrule 4 according to one embodiment of the first invention. The collimator 1 is comprised of an optical fiber tape conductor (hereinafter referred to as an optical fiber) 2, and the ferrule 4 that holds the optical fiber 2. The collimator 1 is provided with, for example, four collimator lenses 5, the lens unit 7 that holds the collimator lenses 5, and integrating means that integrally combines the ferrule 4 and lens unit 7.

The integrating means is provided in the ferrule 4, and is comprised of guide pins 9 that pass through respective through holes 8 of the lens unit 7. The ferrule 4 is formed of a block that fixes and holds the optical fibers and is made of plastic, ceramic, or the like.

The ferrule 4 is produced based on an MT (Mechanically Transferable) connector with a high position precision of sub-micron order (±0.1 μm). FIG. 1-1A shows a case that four optical fibers 10 are disposed in parallel to one another, but the first invention is not limited to such a case, and is applicable to other cases that a single optical fiber 10 is held and that a plurality of optical fibers 10 are disposed at a plurality of stages, for example. Further, the ferrule 4 may be produced based on MPO provided with a housing and clip, MT-RJ connector or the like.

FIGS. 1-1A and 1-1B show a separate type allowing the lens unit 7 to be exchanged. However, it may be possible to produce integrally the lens unit 7 with the ferrule 4 in advance, or to bond the unit 7 and ferrule 4 with an adhesive to use.

As shown in FIGS. 1-2A and 1-2B, a first ferrule and a second ferrule each composing the above-mentioned collimator 1 can be combined.

FIGS. 1-2A and 1-2B are perspective views showing a configuration of a functional optical module 11 according to one embodiment of the first invention. The functional optical module 11 uses two lens-exchange type collimators 1 according to the one embodiment of the first invention shown in FIGS. 1-1A and 1-1B.

The functional optical module 11 is comprised of ferrules 4-1 and 4-2 each the same as the ferrule 4 in FIGS. 1-1A and 1-1B, lens units 7-1 and 7-2 each the same as the lens unit 7 in FIGS. 1-1A and 1-B, an optical functional component 12 that is capable of coming into contact with the lens units 7-1 and 7-2 and that inputs a predetermined effect exerted light beam to each of collimator lenses 5 of the lens units 7-1 or 7-2, and integrating means that integrally combines the ferrule 4-1, lens unit 7-1, optical functional component 12, lens unit 7-2 and ferrule 4-2 and aligns these parts.

In addition, the lens unit 7-2 is not needed always, and can be omitted in some cases.

The integrating means is provided in the ferrule 4-1, and is composed of guide pins 9 that pass through respective through holes 8 provided in the lens unit 7-1 and optical functional component 12 and are inserted into respective holes 13 provided in the ferrule 4-2. This embodiment illustrates the case that the integrating means is further provided with clip members 14 in addition to the guide pins 9. The clip members 14 apply pressures to each of ferrules 4-1 and 4-2, and thereby secure the ferrule 4-1, lens unit 7-1, optical functional component 12, lens unit 7-2, and ferrule 4-2 to respective positions. It is thereby possible to make the alignment and condition held by the guide pins 9 more reliable.

FIG. 1-2B is a perspective view showing a combined state in which ferrule 4-1, lens unit 7-1, optical functional component 12, lens unit 7-2 and ferrule 4-2 are integrally combined by the integrating means, i.e., a state in which the optical functional component 12 is sandwiched between two lens-exchange type collimators.

This embodiment illustrates the case that the optical functional component 12 is, for example, a variable optical attenuator 12 capable of changing optical attenuation arbitrarily. The variable optical attenuator 12 is manufactured using the MEMS (Micro-Elector Mechanism System) technique, and its thickness is determined by a focal length of a collimator lens. An operation length of the collimator lens 5 (FIGS. 1-1A and 1-1B) is, for example, 500 μm. A length between the lens units 7-1 and 7-2, such that the lens units 7-1 and 7-2 having the collimator lenses are capable of transmitting and receiving light beams with the theoretically smallest loss, is about 1 mm that is twice the operation length of the collimator lens. Accordingly, the thickness of the variable optical attenuator 12 is 1 mm.

The collimator lens 5 has a diffractive index with an approximately square distribution, and adjusts an output light beam to be a collimated light beam with a spread degree of within ±2°. By thus obtaining a collimated light beam, it is possible to dispose a plurality of lens-exchange type collimators 1 opposed to one another, and to suppress an optical loss of a light beam transmitted and received between the collimators 1 to a minimum.

Further, anti-reflection coating can be applied on one side or both sides of the collimator lens 5 to prevent an optical loss caused by reflection, and it is thereby possible to prevent the above-mentioned optical loss with more reliability.

In FIGS. 1-1A and 1-B, the collimator lens 5 may be a GI fiber with a predetermined length, but is not limited to such a fiber.

The lens unit 7 is obtained by embedding and fixing lenses at predetermined intervals into, for example, a synthetic resin, has a high position precision of sub-micron order as well as the ferrule 4, and holds the collimator lenses 5 at positions adjusted precisely in order to transmit and receive light beams to/from optical fibers 10 with the minimum optical loss. Therefore, a distance between the position of the lens and a front end of the optical fiber conductor is adjusted when necessary.

Positions of the through holes 8 and guide pins 9 are precisely adjusted so as to hold optimal positions of the collimator lenses 5 and optical fibers 10. Then, as shown in FIG. 1-2B, the guide pins 9 pass through respective through holes 8, thereby the ferrule 4 and lens unit 7 are integrally combined, and thus the collimator lenses 5 and optical fibers 10 are aligned precisely and held in optimal positions assuredly.

Further, the guide pings 9 have a length adequate to integrally combine an optical functional component not shown with through holes the same as through holes 8, another lens unit and another ferrule. Conventionally, in using optical functional components, since optical properties of the components are different with their types, it is necessary to exchange a collimator lens to one with the same property as that of a used component, which puts an enormous load on those skilled in the art, as described previously.

On the contrary, the lens-exchange type collimator 1 of the first invention is, as described above, capable of attaching and detaching the lens unit and aligning the lens unit (collimator lens) and ferrule (optical fiber) accurately using the through holes and guide pins. Accordingly, in the lens-exchange type collimator 1 of the first invention, a plurality of lens units having respective lenses with different optical properties is prepared and exchanged with one another, whereby it is possible to exchange lenses to those corresponding to various optical functional components readily and promptly, and to solve the above-mentioned problem.

FIG. 1-3A is a schematic view of the variable optical attenuator 12, and FIG. 1-3B is an enlarged view of the variable optical attenuator 12 illustrated in FIG. 1-3A. The variable optical attenuator 12 is provided with, for example, comb-shaped actuator 15 (15-1 and 15-2), driving spring 16 and light shield plate 17 which are bonded to one another. The comb-shaped actuator 15 (15-1 and 15-2) is driven by static electricity, uses repulsion against the driving spring 16 to move the light shield plate 17, varies a light shield area, and thereby varies the attenuation of a light beam 103.

The variable optical attenuator 12 is precisely adjusted in size, position of the light shield plate 17 or the like so as to exert attenuating effects accurately on the light beam 103 communicated between the lens units 7-1 and 7-2 shown in FIGS. 1-1B. In addition, it may be possible to form a front end portion of the light shield plate 17 into the shape of an arbitrary polygon, not shown but for example, the inverse shape of a V, instead of the shape of a rectangle. Such a shape decreases the polarization dependency of optical attenuation.

FIG. 1-4 shows an optical functional component 70 using liquid crystal films 74 that adjust the intensity of light. Each of the liquid crystal films is placed on one of four optical paths of light beam, and applying a current to each liquid crystal film through wiring 75 adjusts the intensity of each light beam. A thickness of the liquid crystal film is about 600 μm. Since the refractive index of the liquid crystal film is not less than 1 (not less than the air), a theoretical opposite length of collimators is about 1 mm. However, since the refractive index is high, the opposite length is decreased corresponding to the refractive index, and corresponding to the decreased length, the thickness is made thinner.

For example, when an opposite length of lens units with collimator functions is about 1 mm in the air, if the optical path is filled with a medium with a refractive index of 2, the theoretical opposite length is about 500 μm. The liquid crystal film is connected to the electric wiring 75, and, for example, a voltage is controlled to vary a transmittance in the liquid crystal, whereby the intensity of light can be adjusted.

Further, it may be possible to use, as a lens unit used in the embodiment previously mentioned, a condenser type with a spot size of about 20 μm and theoretical opposite length of 700 μm, and as the means for adjusting the intensity of light, a medium varying its refractive index with current. Such a medium includes a semiconductor such as GaAs or InP doped glass made of primarily silica. Also available is a medium with $LiTaO_3$, $LiNbO_3$, or a double hetero structure such as GaInAsP/InP or GaAlAs/GaAs.

A thickness of the means for adjusting the intensity of light is about 500 μm in the optical axis. The means for adjusting the intensity of light of this case varies the refractive index, thereby substantially varies an optical path length, and makes an axis deviation amount variable in the optical axis direction in the collimator. In other words, since varying the refractive index has an effect equal to varying an opposite length of collimators, the adjustment of intensity of light is implemented by varying the refractive index.

Further, the reason for using a condenser type collimator is that the tolerance on the axis deviation in the axis direction is smaller in the condenser type than in the parallel type. Therefore, in the axis deviation of about ±1000 μm, while the parallel type has a loss of about 0.2 dB, the condenser type has a large loss of about 20 dB and thus enables a large variation in the intensity of light due to a small variation in its refractive index.

Furthermore, as shown in FIG. 1-5, a filter 80 using dielectric multi-layer films 84 is inserted as an optical functional component between the lens units previously mentioned. Each of the dielectric multilayer films is provided on one of four optical paths of light beam, and varies its film structure to cause light with a predetermined wavelength to transmit through the film. As the dielectric multilayer film, for example, a lamination of $SiO_2$ and $Ta_2O_5$ with a thickness of about 800 μm is used. Since the refractive index of the dielectric multilayer film is not less than 1 (not less than the air), the theoretical opposite length of collimators is about 1 μmm, but is decreased corresponding to the high refractive index. Therefore, corresponding to the deceased length, the thickness is made thinner.

FIG. 1-6 is a perspective view showing a configuration of a functional optical module 18 according to another embodiment of the first invention where all the members are integrally combined. The functional optical module 18 is obtained by modifying the integrating means of the functional optical module 11 according to the one embodiment of the first invention shown in FIG. 1-2A.

The integrating means of the functional optical module 11 in FIG. 1-2A has a configuration where the guide pins 9 are inserted into respective through holes 13 provided in the ferrule 4-2. In contrast thereto, the integrating means of the functional optical module 18 is provided with guide pins 9 passing through respective through holes 8 provided in a ferrule 4-3 instead of the holes 13 in FIG. 1-2A, and cap-shaped securing members 19 that secure passing guide pins 9 and thereby secure the whole.

Further, it may be possible to provide the guide pins 9 with screw threads while providing internal threads corresponding to the screw threads on inner surfaces of the securing members 19, whereby it is possible to engage the guide pins and securing members more strongly.

In addition, as mentioned previously, the ferrule 4-3 of the functional optical module 18 according to this embodiment is provided with through holes 8, while the ferrule 4-1 of the functional optical module 11 in FIG. 1-2A is provided with holes 13. Therefore, different reference numerals are assigned to distinguish between the ferrules, but the difference between the ferrules is only the aforementioned respect, and the ferrules have the same functions and structures except this respect.

Further, the functional optical module 18 has the same members in function, structure or the like as those in the functional optical module 11 in FIGS. 1-2A and 1-2B except the ferrule 4-3.

FIG. 1-7 is a perspective view showing a configuration of a functional optical module 20 according to another embodiment of the first invention where all the members are integrally combined. The functional optical module 20 is obtained by modifying the integrating means of the functional optical module 11 according to the one embodiment of the first invention shown in FIGS. 1-2A and 1-2B.

The integrating means of the functional optical module 20 is provided with a latch member 21 provided in a ferrule 4-4 instead of the clip member 14. The latch member 21 engages in an engaging portion 22 having a groove in its inside provided in the ferrule 4-5, and thereby brings the ferrule 4-4, lens unit 7-1, optical functional component 12, lens unit 7-2 and ferrule 4-5 into intimate contact with one another.

The ferrule 4-4 is the same in function, structure or the like as the ferrule 4-1 in FIGS. 1-2A and 1-2B except the latch member 21 being provided, while the ferrule 4-5 is the same in function, structure or the like as the ferrule 4-2 in FIGS. 1-2A and 1-2B except the engaging portion 22 being provided. Further, the functional optical module 20 has the same members in function, structure or the like as those in the functional optical module 11 in FIGS. 1-1A and 1-1B except the ferrules 4-4 and 4-5.

While in the functional optical module 20 in FIG. 1-7 the latch member 21 is provided in the ferrule 4-4 and the engaging portion 22 is provided in the ferrule 4-5, it may be possible to provide the latch member 21 in the ferrule 4-5, and the engaging portion 22 in the ferrule 4-4.

Further, the latch member 21 and engaging portion 22 according to this embodiment may be provided in the functional optical module 11 in FIGS. 1-2A and 1-2B or the functional optical module 18 in FIG. 1-4.

FIG. 1-8A is a perspective view showing a configuration of a functional optical module 23 according to another embodiment of the first invention, and FIG. 1-8B is a perspective view showing integrally combined all the members of FIG. 1-8A.

The functional optical module 23 is provided with a single lens-exchange type collimator 1, while the functional optical modules according to the other embodiments of the first invention described above are provided with two lens-exchange type collimators 1.

The functional optical module 23 is provided with an optical fiber portion composed of a ferrule 4-6, a lens unit composed of a lens unit 7-3, an optical functional component 24 that is capable of coming into contact with the lens unit 7-3 and inputs a predetermined effect exerted light beam to collimator lenses 5 of the lens unit 7-3, and the integrating means that integrally combines and aligns the ferrule 4-6, lens unit 7-3 and optical functional component 24.

The ferrule 4-6 is modified from the ferrule 4-4 in FIGS. 1-1A and 1-1B, holds, for example, sixty optical fibers 10 arranged in 5 fibers high by 12 fibers wide, and is the same in structure, function or the like as the ferrule 4 except the number of optical fibers 10.

The lens unit 7-3 holds, for example, sixty collimator lenses 5 arranged in 5 lenses high by 12 lenses wide, and is the same in structure, function or the like as the lens unit 7 except the number of collimator lenses 5 previously mentioned.

The integrating means is provided in the ferrule 4-6, and is composed of guide pins 9 that pass through respective through holes 8 provided in the lens unit 7-3 are that inserted into respective holes 13 provided in the optical functional component 24.

This embodiment illustrates the case that the integrating means is further provided with clip members 25 in addition to the guide pins 9. The clip members 25 apply pressures to each of the ferrule 4-6 and optical functional component 24, and thereby bring the ferrule 4-6, lens unit 7-3, and optical functional component 24 into intimate contact with one another. It is thereby possible to make the alignment and condition held by the guide pins 9 more reliable.

This embodiment illustrates the case that the optical functional component 24 is a surface-emitting laser device 24 with a plurality of two-dimensionally arranged laser-emitting devices.

FIG. 1-9A is a perspective view showing a configuration of the surface-emitting laser device 24. FIG. 1-9B is an enlarged front view of a main body 26 of the device of FIG. 1-9A. The surface-emitting laser device 24 is provided with the main body 26 of the device that executes laser oscillation and laser radiation and a spacer 27. The main body 26 of the device has on its front surface, for example, sixty laser-emitting devices 28 composed of a laminate thin film of semiconductor such as GaAs, and the laser-emitting devices 28 are arranged in the same way as in the collimator lenses 5 or optical fibers 10, for example, in 5 devices high by 12 devices wide.

The spacer 27 is positioned between the main body 26 of the device and lens unit 7-3 (FIG. 1-8A), provides a space in which a laser beam propagates when the laser-emitting elements 28 emit laser beams to the lens unit 7-3, is provided with through holes 8 through which guide pings pass, and thus is allowed to be attached and detached readily and promptly. A thickness of the spacer 27 is determined by optical properties of laser beam, and, for example, is 250 µm.

Laser devices with two-dimensionally arranged laser-emitting devices have been produced. However, since it is difficult to obtain optical coupling of a collimator lens and optical fiber with a low loss, arranging laser-emitting devices two-dimensionally has not been implemented.

On the contrary, in the surface-emitting laser device 24 of this embodiment, a plurality of spacers with different thickness are prepared and exchanged corresponding to laser optical properties, whereby it is possible to overcome the above-mentioned matter. In addition thereto, it is possible to attach and detach the spacer 27 readily and promptly as described above, and such conveniences and the simplified exchange of the lens-exchange type collimator 1 as described previously implement further improvements in operation efficiency.

In the surface-emitting laser device 24 as described above, the size adjustment and alignment of the main body 26 of the device and spacer 27 is precisely adjusted. Further, the size adjustment and alignment of the laser device 24, collimator lenses 5 and lens unit 7-3 is precisely adjusted in order that laser beams are accurately input to the lens unit 7-3 with collimator functions.

In addition, this embodiment illustrates the case that the main body 26 of the device and spacer 27 are different members, but is not limited to such a case; it may be possible to construct both members integrally.

As a configuration of a functional optical module 29 according to another embodiment of the present invention, the module 29 may have the configuration where through holes 8 are provided in the surface-emitting laser device 26, and guide pins 9 passing through respective through holes 8 are secured by cap-shaped securing members 19, and in this case, the surface-emitting laser device 26 has the same function, configuration or the like as that shown in FIG. 1-6 except the through holes 8 being provided.

Further, it may be possible to provide the guide pins 9 with screw threads while providing internal threads corresponding to the screw threads on the securing members 19, whereby it is possible to engage the guide pins and securing members more strongly.

FIG. 1-10A is a perspective view showing a configuration of a functional optical module 30 according to another embodiment of the first invention, and FIG. 1-10B is a perspective view showing integrally combined all the members of FIG. 1-10A.

The functional optional module 30 is provided with a latch structure 31 and 32 as the integrating means as shown in FIG. 1-7 and as the adjusting means.

In the functional optical module 30, a latch member 31 is provided in the ferrule 4-7 instead of the clip member 14 shown in FIG. 1-6, an engaging portion 32 with a groove therein is provided in a surfaced-emitting laser device 24-2, and the latch member 31 engages in the engaging portion 32, thereby bringing the ferrule 4-7, lens unit 7-3 and surface-emitting 24-2 into intimate contact with one another.

In addition, the ferrule 4-7 is the same in function, configuration or the like as the ferrule 4-6 except the latch member 31 being provided. The surface-emitting laser device 24-2 is the same in function, configuration or the like as the surface-emitting device 24 in FIGS. 1-8A and 1-8B except the engaging member 32 being provided. Further, the other members are the same in function, configuration or the like as those of the functional optical module 29 shown in FIGS. 1-8A and 1-8B.

In the optical functional component 30, the latch member 31 is provided in the ferrule 4-7, while the engaging portion 32 is provided in the surface-emitting laser device 24-2. Further, it may be possible to provide the latch member 31 in the surface-emitting laser device 24-2, while providing the engaging portion 32 in the ferrule 4-7.

In addition, the above-mentioned embodiments illustrate the case of using one or two collimators with lenses integrally combined with a ferrule or lens-exchange type collimators of a functional optical module. However, the first invention is not limited to the above case, and is applicable to cases of using three or more lens-exchange collimators.

As described above, in the first invention, a collimator integrally combined with a ferrule, or a lens-exchange type of collimator is provided with an optical fiber portion composed of the ferrule that holds optical fibers, collimator lenses, a lens unit that holds the collimator lenses, and the integrating means that integrally combines and aligns these members, and thus the ferrule and lens unit are constructed to be detachable freely.

Further, a functional optical module is provided with the above-mentioned lens-exchange type collimator and an optical functional component that is integrally combined accurately with the lens-exchange type collimator, and thus the optical functional component is also constructed to be detachable.

Furthermore, since optical fibers of the optical fiber portion are held by the ferrule member, there is no risk of breakage. Moreover, since a plurality of optical fibers is arranged in parallel in a single ferrule, miniaturization of the functional optical module is also achieved.

According to the forgoing, it is made possible to provide a lens-exchange type collimator enabling not only a lens but also an optical functional component to be exchanged promptly and readily and being miniaturized and excellent in durability, and a miniaturized functional optical module provided with the lens-exchange type collimator.

(Second Invention)

Power supply devices each for an optical functional component and optical functional modules of the second invention will be described below with reference to accompanying drawings.

In addition, following embodiments are illustrative only and are not intended to limit the scope of the second invention. Accordingly, it will be understood that various modifications including each or all the elements may be made by those skilled in the art and that the scope of the second invention includes such modifications.

First Embodiment

FIG. 2-1 is a perspective view of an optical functional module 100-1 provided with a power supply device for an optical functional component according to the first embodiment of the second invention The optical functional module 100-1 is provided with a cable holding member 102-1 that is secured to a hosing 106-1 and holds an optical fiber 101, an optical functional component 105-1 that is provided on its surface with a reception electrode and exerts a predetermined effect on light, a power supply electrode that is secured to the housing 106-1, holds tight the reception electrode on its side faces, thereby holds the optical functional component 105-1, and supplies power to the reception electrode, and a protecting member 108 that surrounds the power supply electrode, and the reception electrode is connected to an outer power supply not shown.

The power supply device for an optical functional component of the second invention is composed of the reception electrode, power supply electrode and protecting member 108 among the above-mentioned members. In addition, in FIG. 2-1, the reception electrode and power supply electrode are located on an inner face of the protecting member 108, therefore not shown, and will be described specifically with reference to FIGS. 2-2 and 2-3.

The cable holding member 102-1 is provided with a collimator lens 103, and thus functions as a collimator.

This embodiment illustrates a case that the optical functional component 105-1 (hereinafter referred to as a photodiode 105-1) is a photodiode that converts light output from the cable holding member 102-1 to an electric signal.

FIG. 2-2A is an enlarged perspective view of the power supply electrode 107-1 and the protecting member 108, and FIG. 2-2B is an enlarged cross-sectional view of the power supply electrode 107-1 and the protecting member 108.

The power supply electrode 107-1 is comprised of two bent metallic members (107-1a and 107-1b), sandwiches the reception electrode 104 provided on the surface of the photodiode 105-1 by the metallic members 107-1a and 107-b, and thereby holds the photodiode 105-1. FIG. 2-3 illustrates the power supply electrode 107-1 and photodiode 105-1 held by the electrode 107-1.

The metallic members 107-1a and 107-1b assuredly come into intimate contact with the reception electrode 104 by their bent structure and elasticity of metal, and so hold the photodiode 105-1 assuredly and supply power with no loss and with reliability.

Further, the bent structure and elasticity of metal allows the photodiode 105-1 to be detached and/or exchanged to another optical functional component with ease.

The protecting member 108 protects the reception electrode 104 and power supply electrode 107-1, further protects electric leakage from the reception electrode 104 from providing damage to other members, and is made of an insulating material such as a polymer material.

While this embodiment illustrates the case that a box-shaped member is used as the protecting member 108, it may be also possible to use an insulating film.

Thus, the wiring connecting the power supply electrode and reception electrode is eliminated and an optical functional component is supported by the power supply electrode, whereby it is possible to attach/detach the optical functional component freely, and to easily exchange the photodiode 105-1 as illustrated in this embodiment to an optical functional component with a different function such as an optical attenuator.

Further, the risk is eliminated that the optical functional component sustains damage due to heat and vibration caused by breaking or bonding of the wiring.

Furthermore, part of the housing is made open and closed, and it is thereby possible to omit a process for opening the housing in exchanging optical functional components, and to perform the exchange promptly.

In all the optical modules including conventional cases as previously descried, when the alignment of the optical functional component and cable holding member (collimator) is not improper, there is a case that the optical functional component cannot exhibit predetermined performance due to an optical loss, for example.

Therefore, in the optical functional module of the second invention, the alignment of the power supply electrode 107-1 and cable holding member 102-1 is performed precisely so that the photodiode 105-1 exerts an effect accurately on a light beam output from the cable holding member 102-1, and also on photodiode 105-1 and other optical functional components, independently of types, adjustment in size or the like is performed precisely.

Second Embodiment

FIG. 2-4 is a perspective view of an optical functional module 100-2 according to the second embodiment of the second invention.

The optical functional module 100-2 uses a surface-emitting semiconductor laser board (hereinafter referred to as a semiconductor laser board 105-2) as an optical functional component 105-2, has a cable holding member 102-2 for laser condenser being attached to a housing 106-2 via a connector receptacle 109, and further has the same members in function, configuration or the like as those of the optical functional module 100-1 in FIG. 2-1 except the foregoing.

When the semiconductor laser board 105-2 is used, some type of cable holding member that receives laser beams may not obtain a desired coupling efficiency due to, for example, a difference in beam shape between a collimator lens provided in the cable holding member and laser. Therefore, it is required to exchange such a type of member to a cable holding member 102-2 for laser condenser which has a collimator lens suitable for the laser beam shape, and minimizes an optical loss by adjusting a distance between a front end of the optical fiber and collimator lens corresponding to a focal length of the lens.

This process needs to be performed whenever the optical functional component is exchanged to a different type of component, and so requires easy operation. Then, the cable holding member 102-2 is attached to the housing 106 via the connector receptacle 109.

As the cable receptacle 109, a receptacle for a FC connector is used, and the cable holding member 102-2 is equipped on its front end with a FC connector 110 corresponding to the receptacle.

Third Embodiment

FIG. 2-5 is a perspective view of an optical functional module 100-3 according to the third embodiment of the second invention.

The optical functional module 100-3 is modified from the optical functional module 100-1 in FIG. 2-1, and has an array with cable holding members 102-1 and photodiodes 105-1 in a housing 106-3. This embodiment illustrates a case of four cable holding members 102-1 and four photodiodes 105-1 both spaced at intervals of 1 cm, but the second invention is not limited to the above case. A configuration may be possible which has an array with optical functional components with different functions such as the cable holding member 102-2 and semiconductor laser board 105-2 shown in FIG. 2-4.

Fourth Embodiment

FIG. 2-6A is a perspective view of an optical functional module 100-4 according to the fourth embodiment of the second invention.

The optical functional module 100-4 is modified from the optical functional module 100-1 in FIG. 2-1, and is provided with a housing 106-4, two cable holding members 102-1 fixed at positions opposed to each other, and an optical attenuator 105-3 as an optical functional component.

FIG. 2-6B is a front view of the optical attenuator 105-3.

The optical attenuator 105-3 is manufactured using the MEMS (Micro Electro Mechanical System) technique, moves a shield plate to vary a shield area of light, and thereby attenuates the light.

The optical attenuator 105-3 is provided with a shield plate 116, comb-shaped actuators 117 and driving springs 118 which are coupled to one another.

The comb-shaped actuators 117 are driven by static electricity, use repulsion against the driving springs to move the shield plate 116, and thus attenuate the light 119.

Fifth Embodiment

FIG. 2-7 is a perspective view of an optical functional module 100-5 according to the fifth embodiment of the second invention.

The optical functional module 100-5 is comprised of an optical functional component 105-4, a power supply device for the optical functional component composed of the reception electrode 104, power supply electrode 107-1 and protecting member 108 the same as shown in FIGS. 2-1 to 2-6, two cable holding members 102-3 and a clip 115.

FIG. 2-8 is a perspective view showing primary structural members of the optical functional module 100-5 of FIG. 2-7.

This embodiment illustrates a case that the optical functional component 105-4 is an optical attenuator (hereinafter, referred to as optical attenuator 105-4) provided with a shield plate that shields light communicated between the two cable holding members 102-3.

Each of the cable holding members 102-3 holds an optical cable tape conductor 111 having a plurality of optical fibers, and is provided with collimator lenses. One of the members 102-3 has guide pins 112, while the other one of the members 102-3 has insertion holes 113 corresponding to the guide pings 112.

In addition, cable holding members may be manufactured based on a coexisting connector, and the cable holding members 102-3 in this embodiment are manufactured based on an MT (Mechanically Transferable) connector.

Further, this embodiment illustrates a case that the optical functional component 105-4 is an optical attenuator (hereinafter, referred to as optical attenuator 105-4) provided with a shield plate that shields light communicated between the two cable holding members 102-3.

The optical attenuator 105-4 is manufactured using the MEMS technique as well as the optical attenuator 105-3 in FIG. 2-6, and is provided with through holes 114 through which the guide pins 112 pass. Thus, the shield plate is aligned precisely so as to exert an effect accurately on the light communicated between the two cable holding members 102-3.

Figures 1, 2, 3, 4, 5:
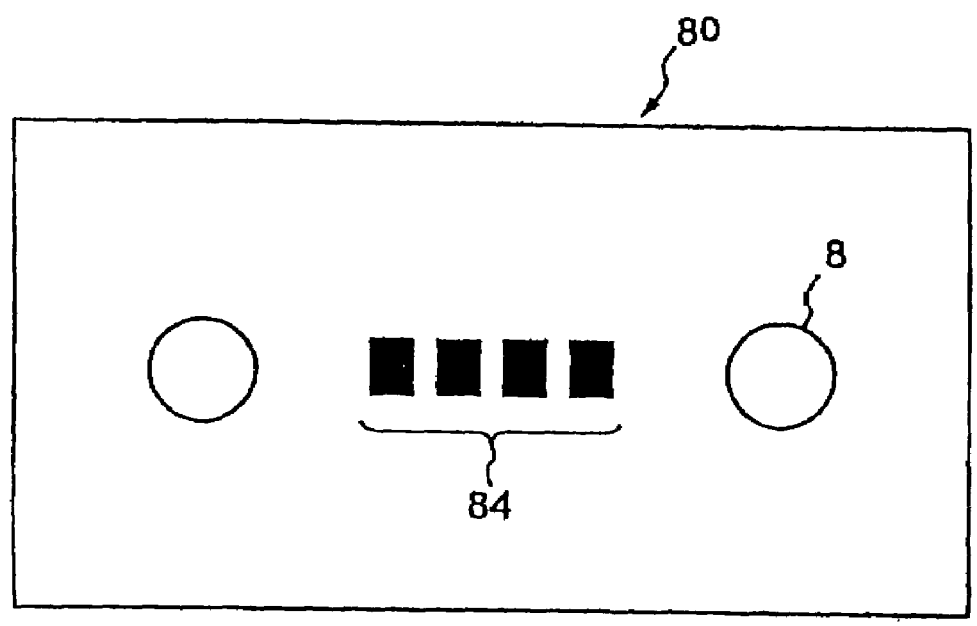
Figures 1, 2, 3, 4, 5, 6:
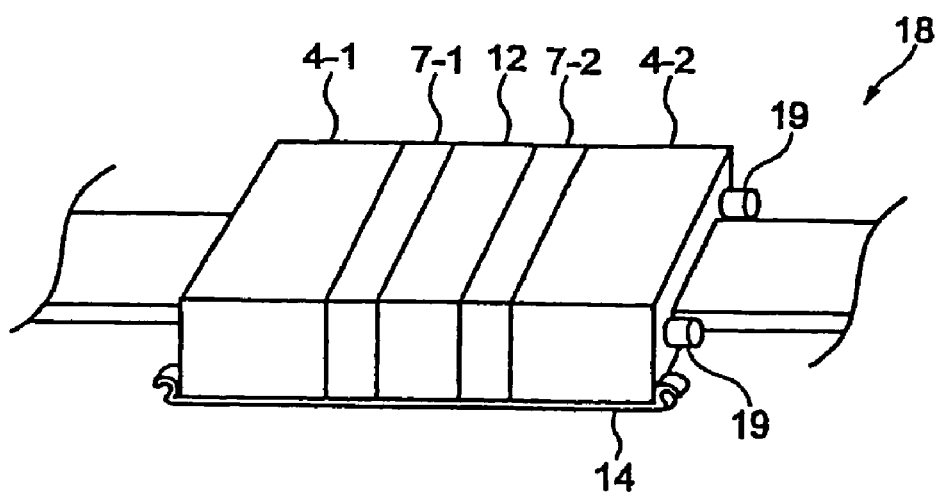
Figures 1, 2, 3, 4, 5, 6, 7:
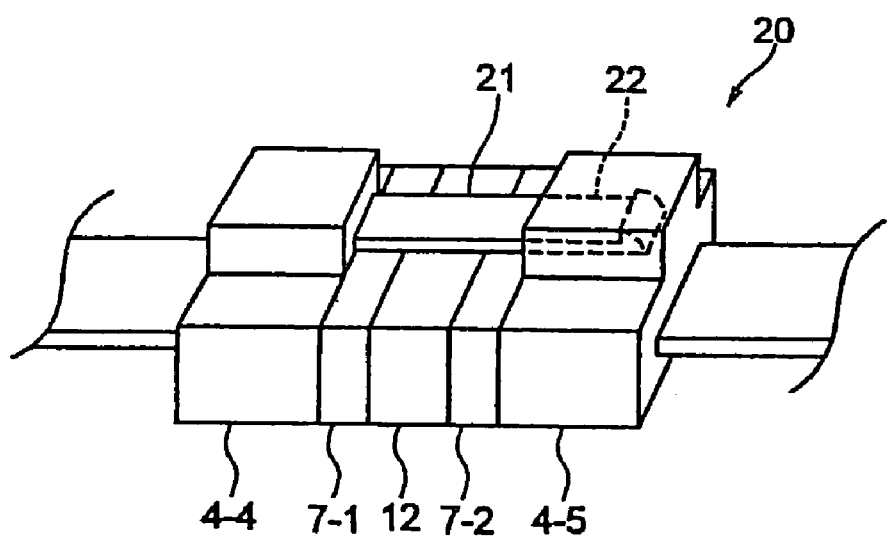
Figures 1, 2, 3, 4, 5, 6, 7, 8, 9, 9A:
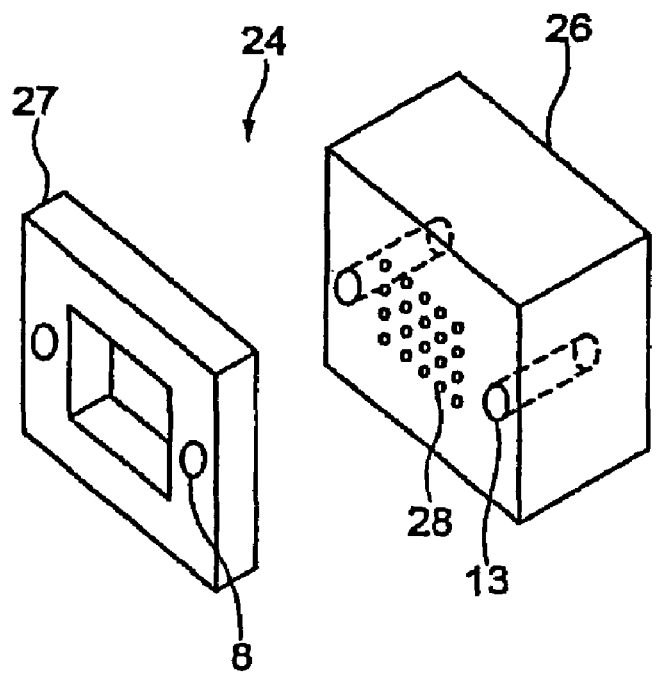
Figures 1, 2, 3, 4, 5, 6, 7, 8, 9, 9B:
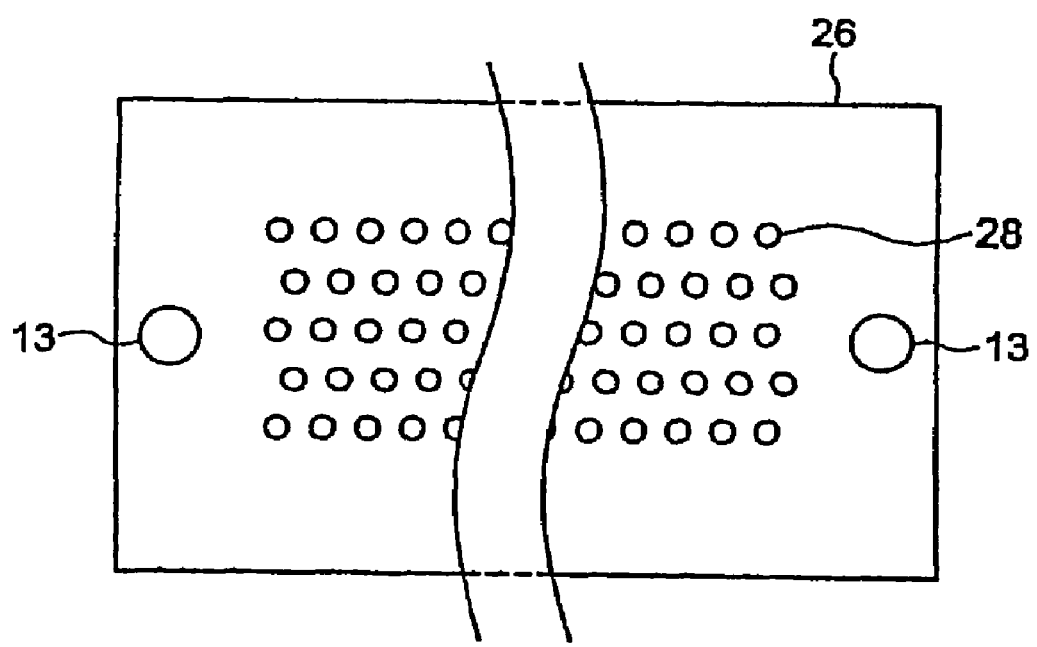
Figures 1, 2, 3, 4, 5, 6, 7, 8, 9, 10, 11:
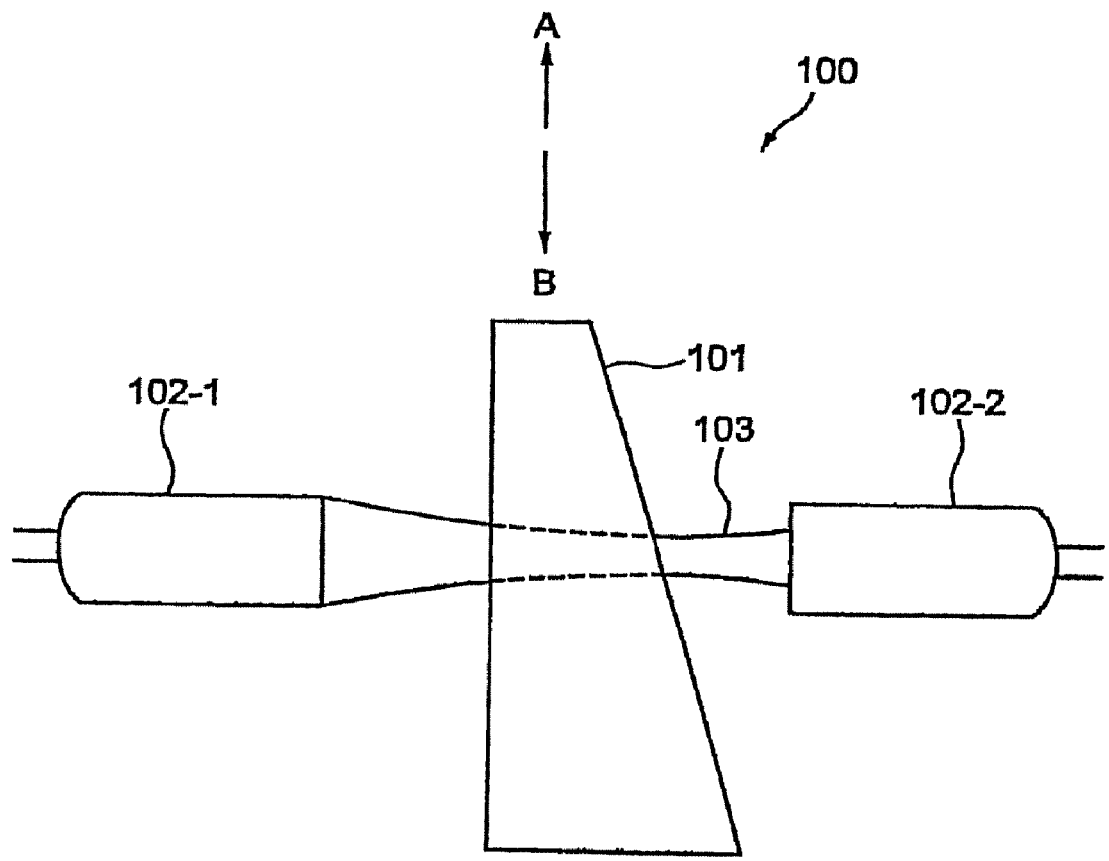
Figures 1, 2:
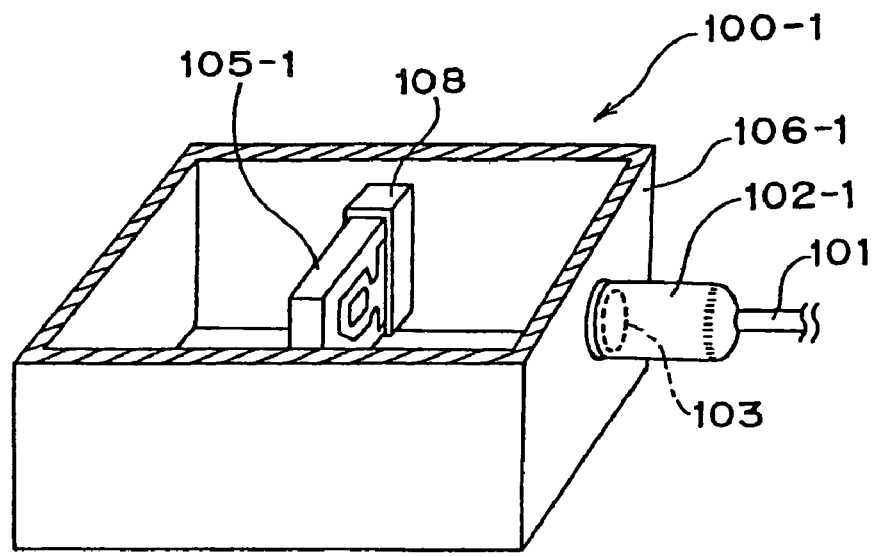
Figures 2, 2A, 2B:
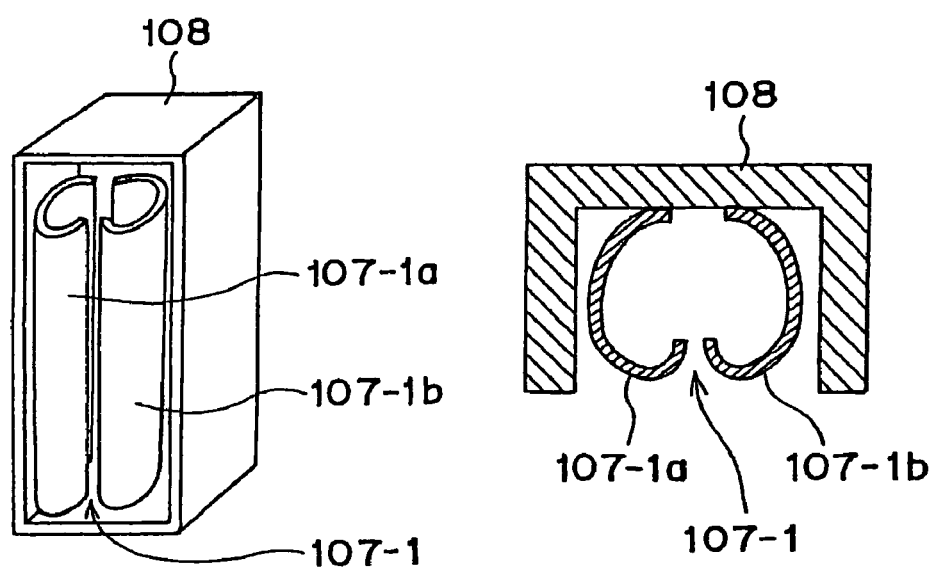
Figures 2, 3:
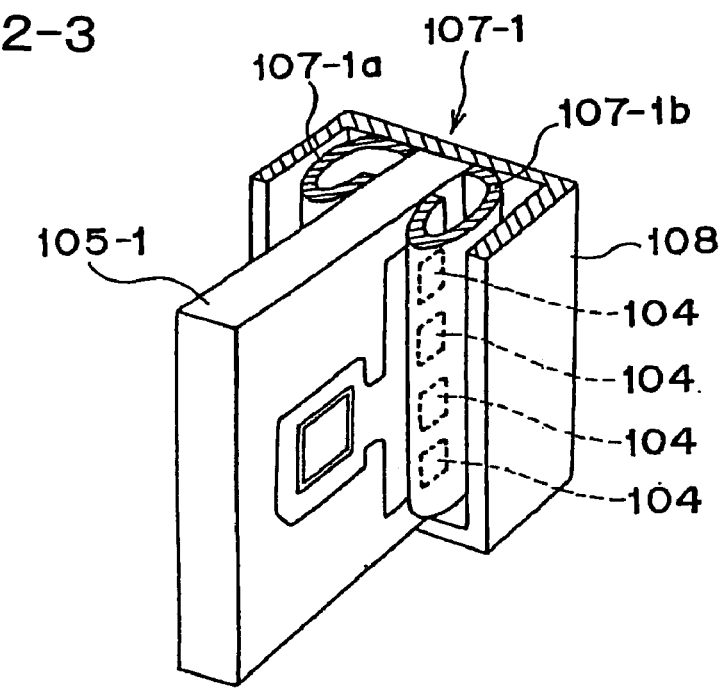
Figures 2, 3, 4:
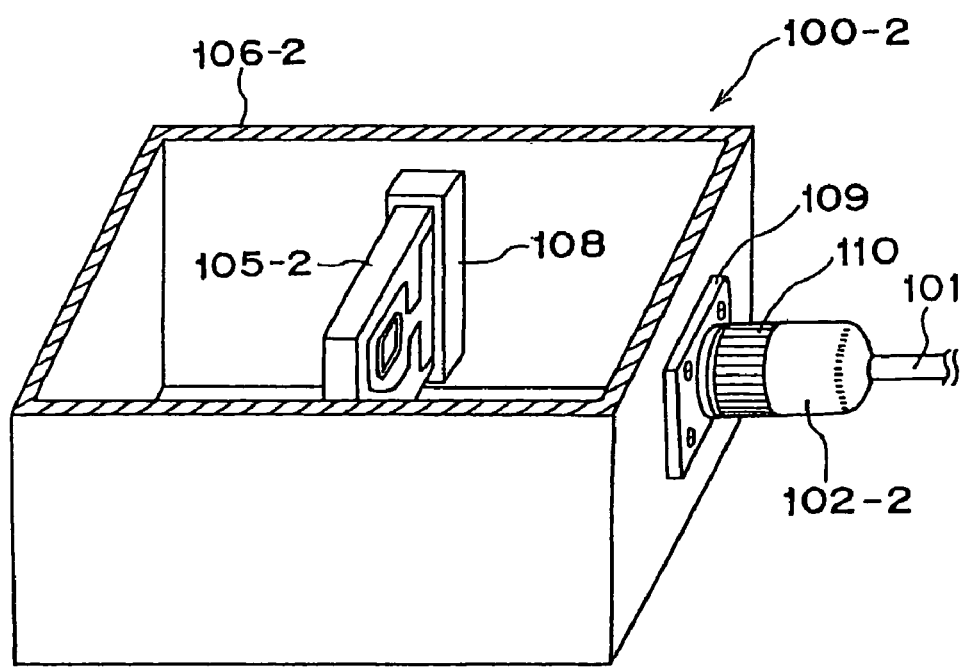
Figures 2, 3, 4, 5:
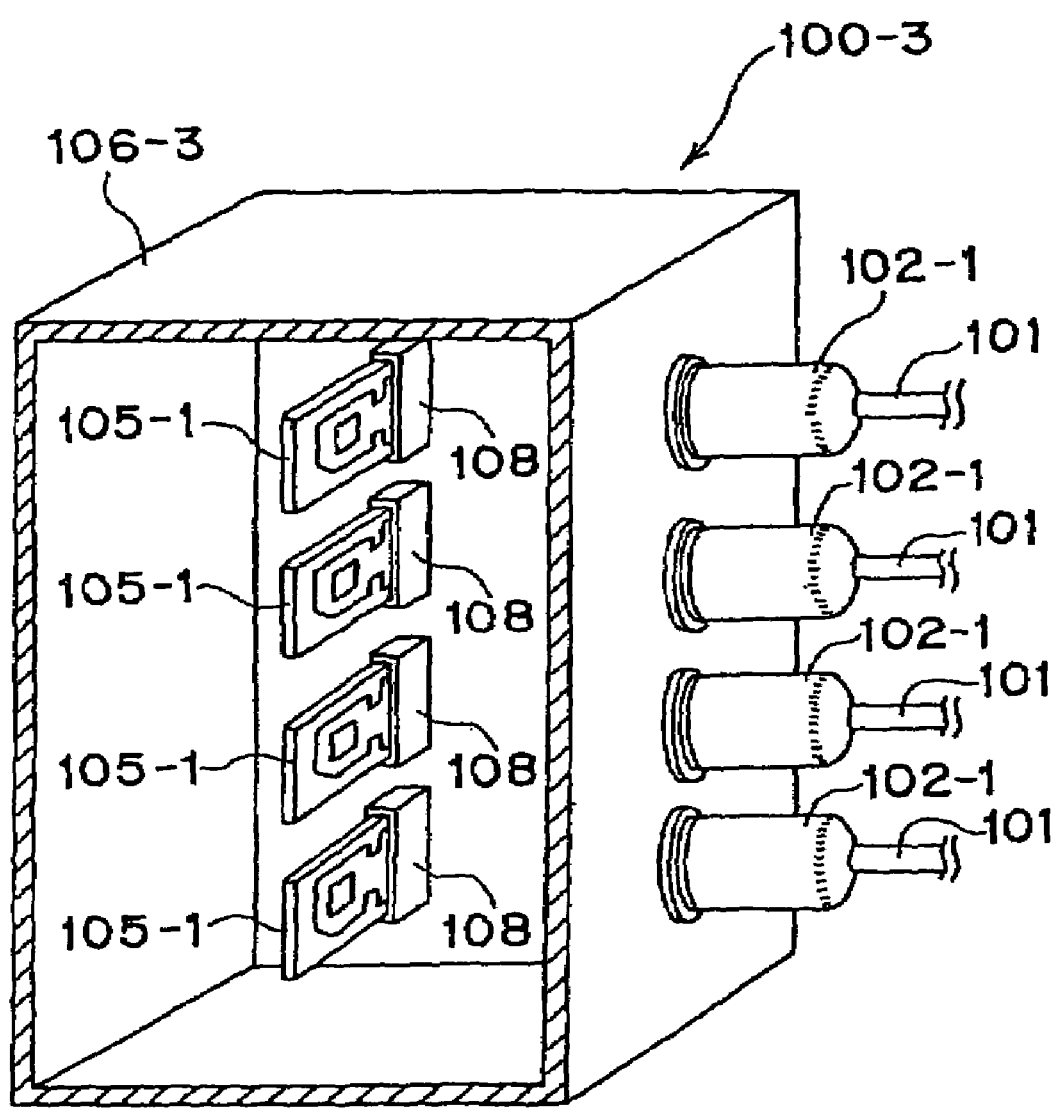
Figures 2, 3, 4, 5, 6, 6A:
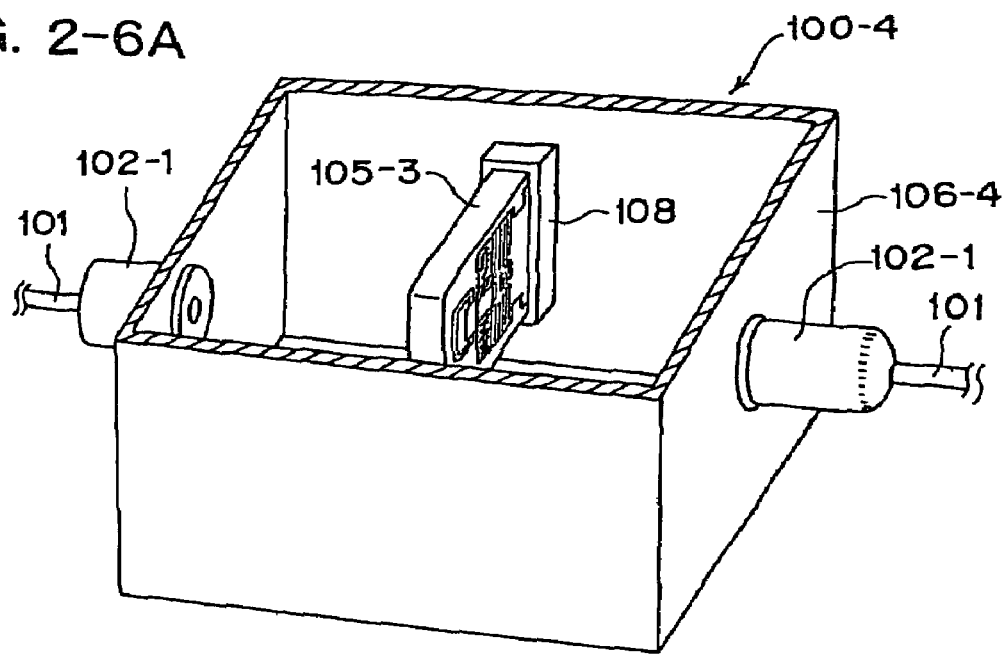
Figures 2, 3, 4, 5, 6, 6B:
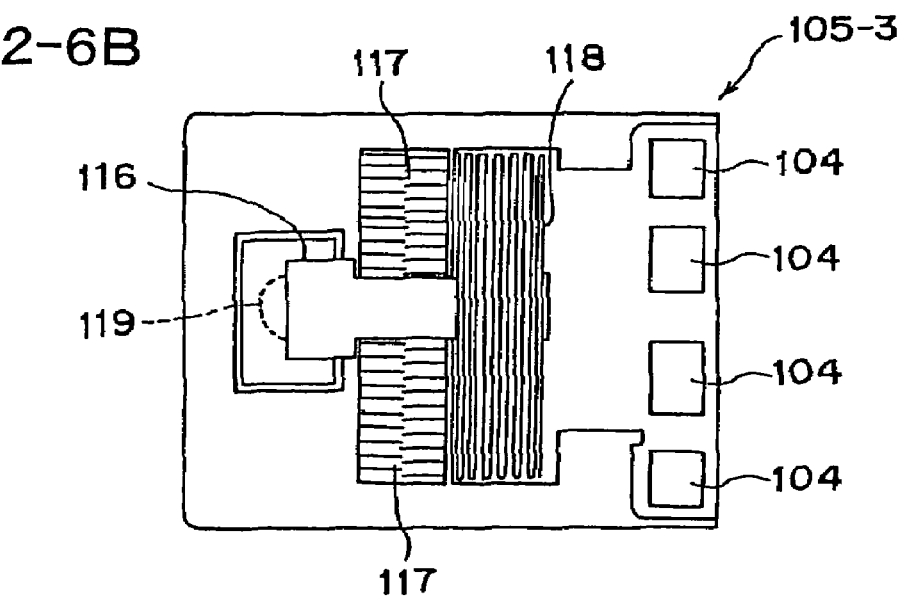
Figures 2, 3, 4, 5, 6, 7:
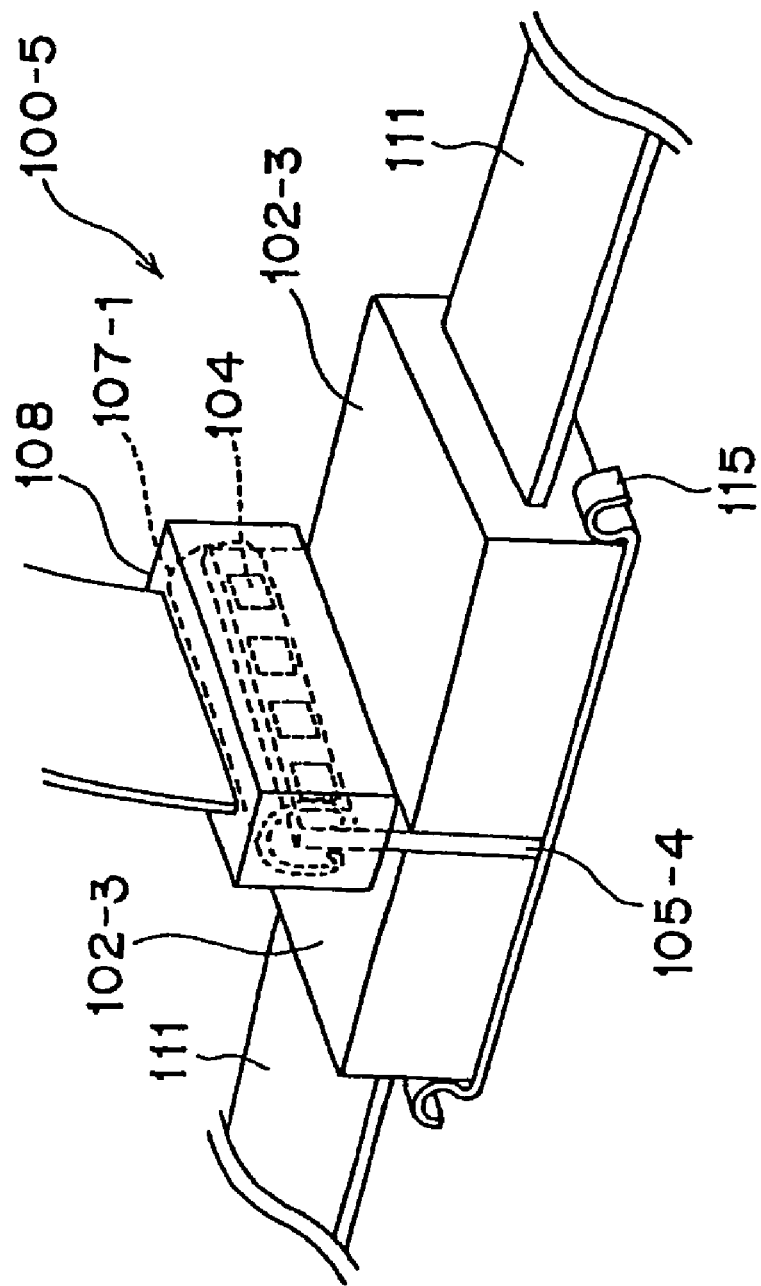
Figures 2, 3, 4, 5, 6, 7, 8:
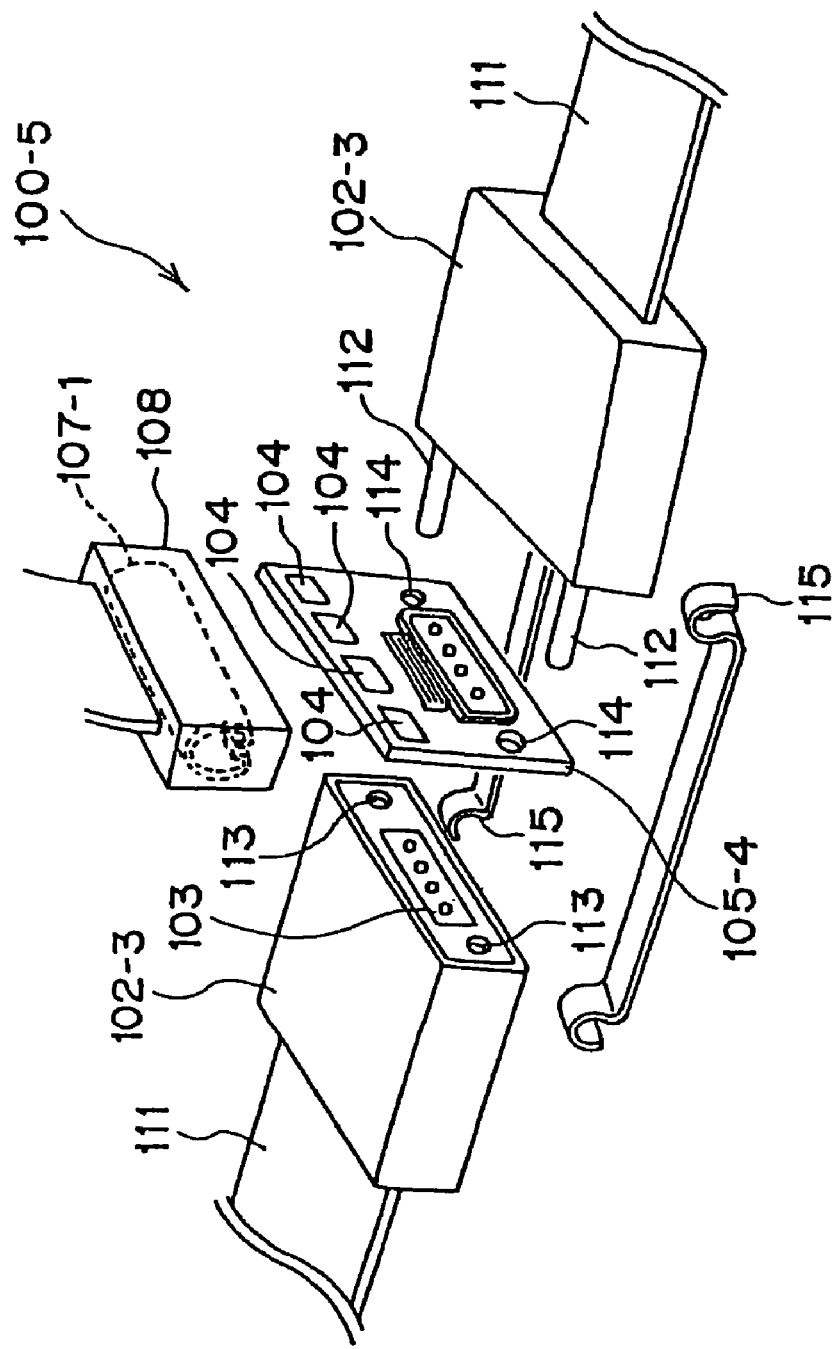
Figures 2, 3, 4, 5, 6, 7, 8, 9:
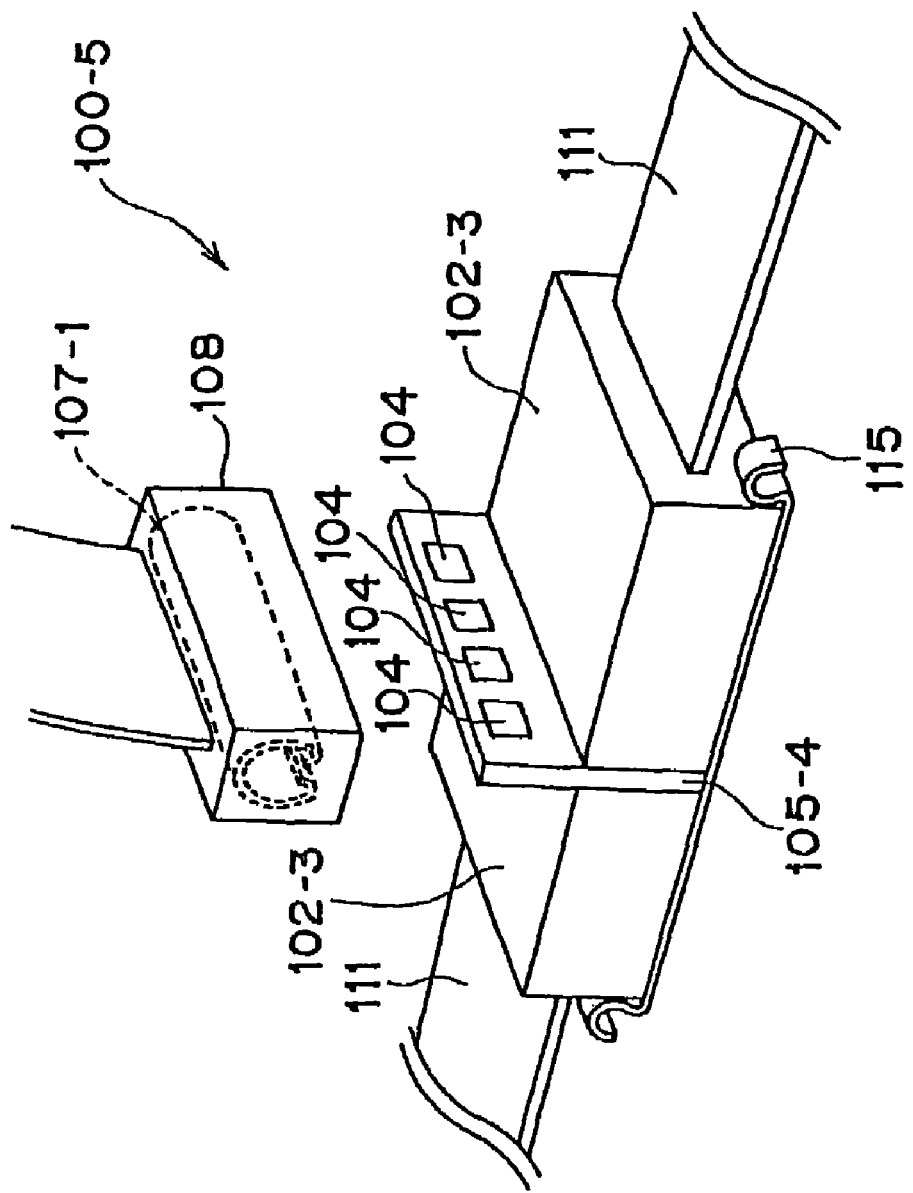
Figures 2, 3, 4, 5, 6, 7, 8, 9, 10:
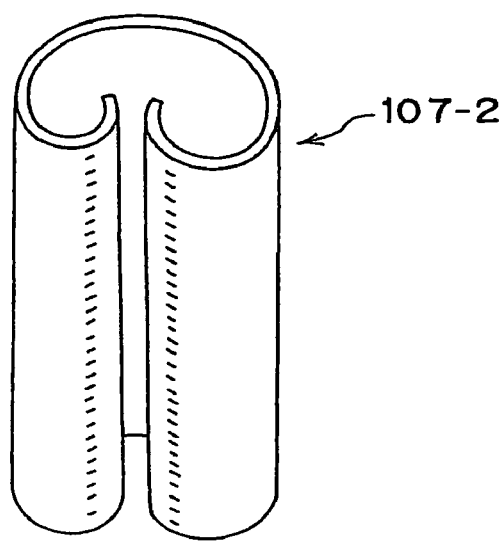
Figures 2, 3, 4, 5, 6, 7, 8, 9, 10, 11:
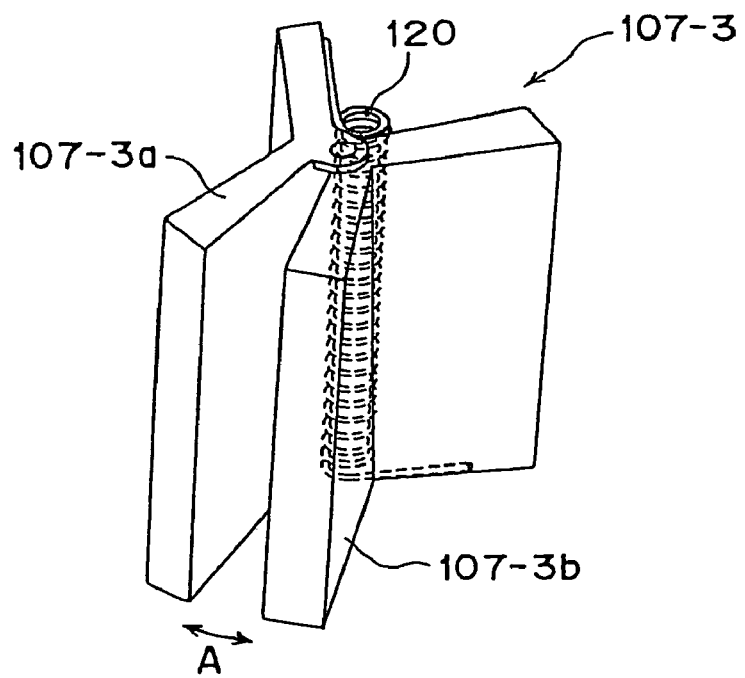
Figures 2, 3, 4, 5, 6, 7, 8, 9, 10, 11, 12:
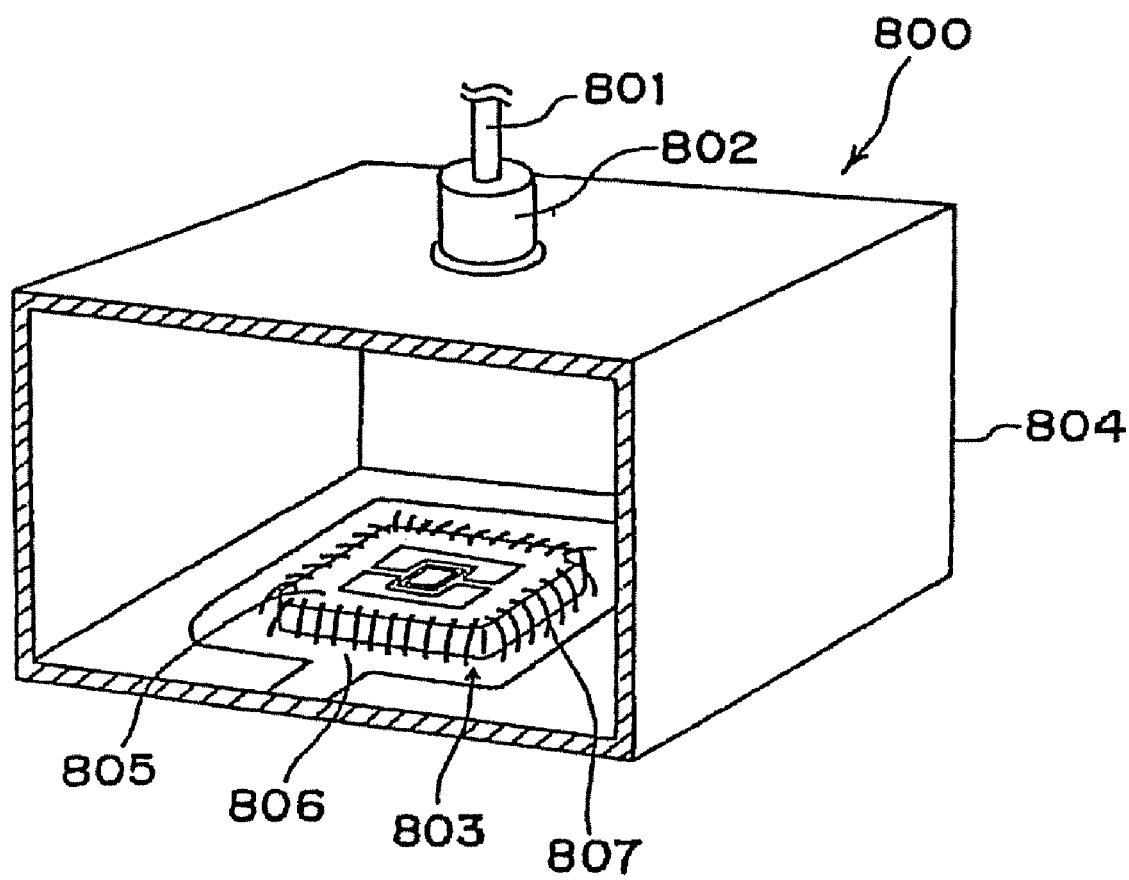
Figures 1, 3:
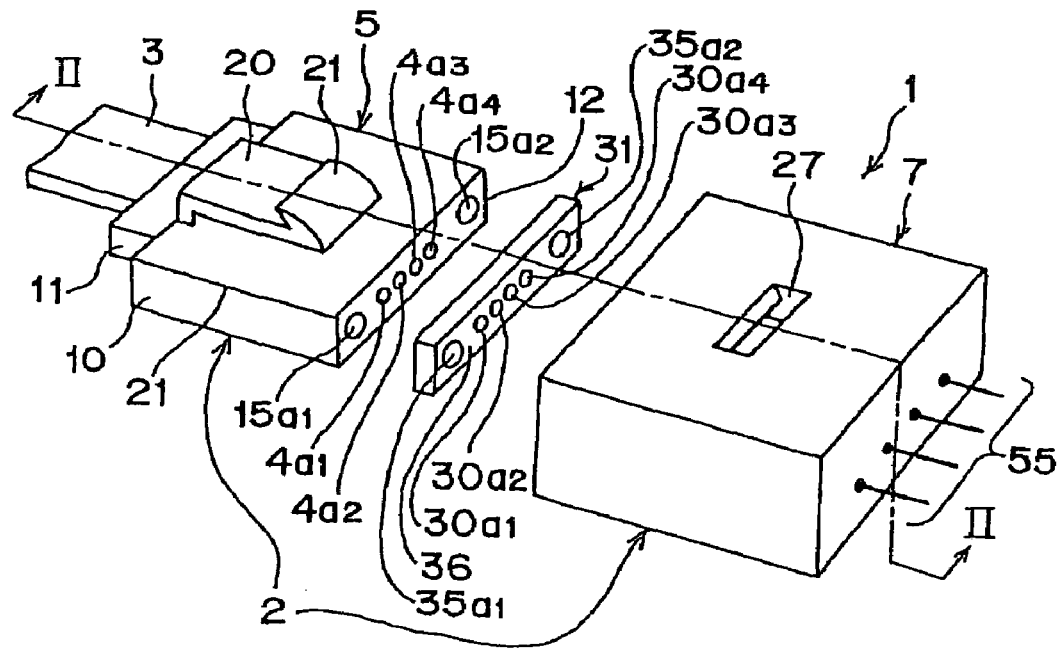
Figures 2, 3:
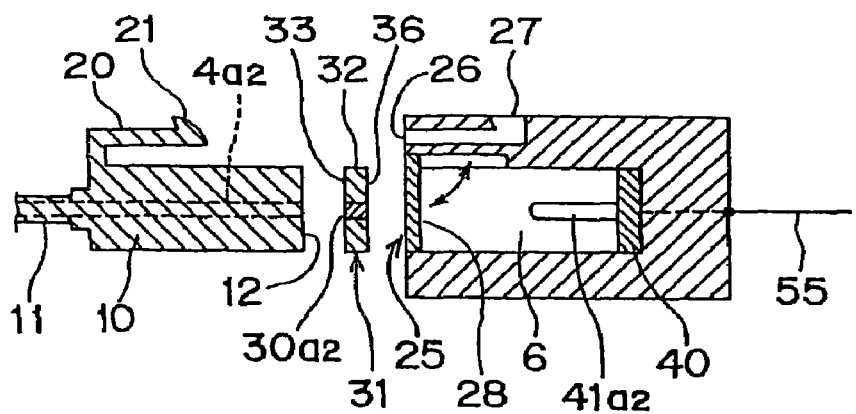
Figure 3:
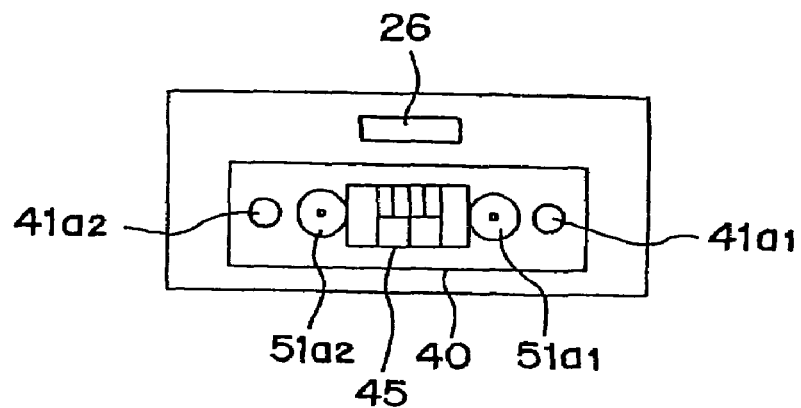
Figures 3, 4:
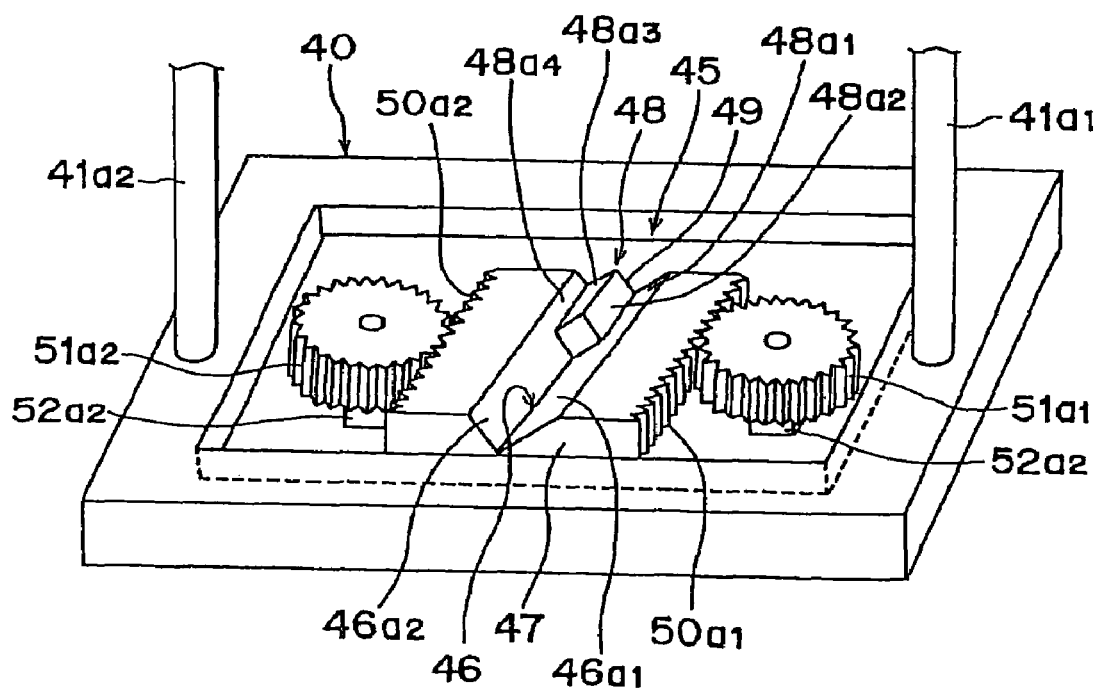
Figures 3, 4, 5, 5A:
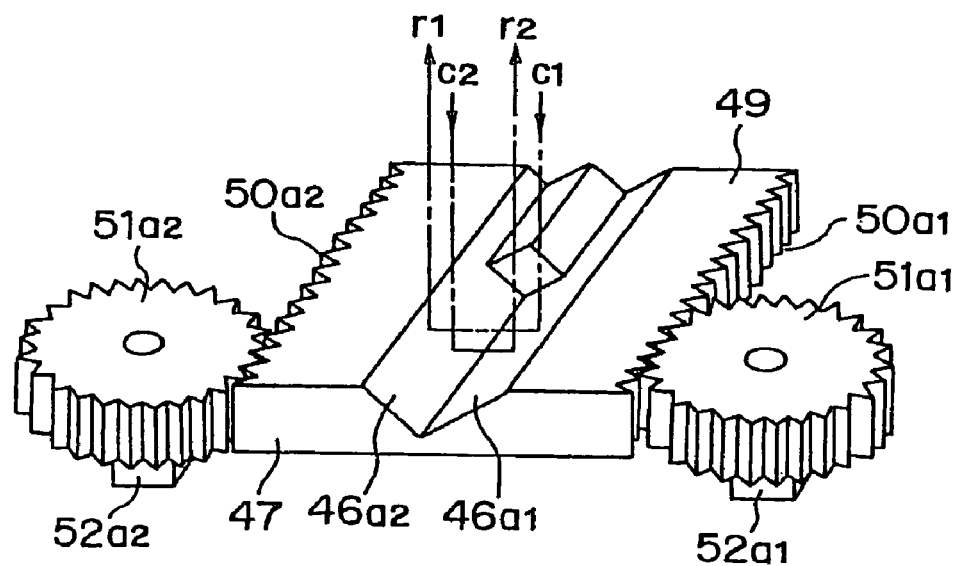
Figures 3, 4, 5, 5B:
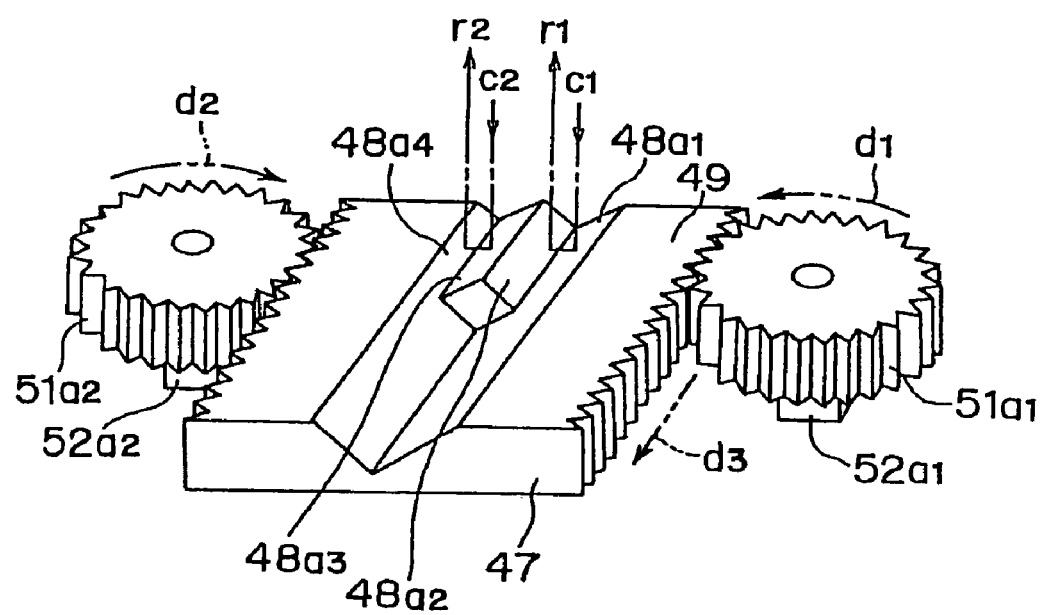
Figures 3, 4, 5, 6:
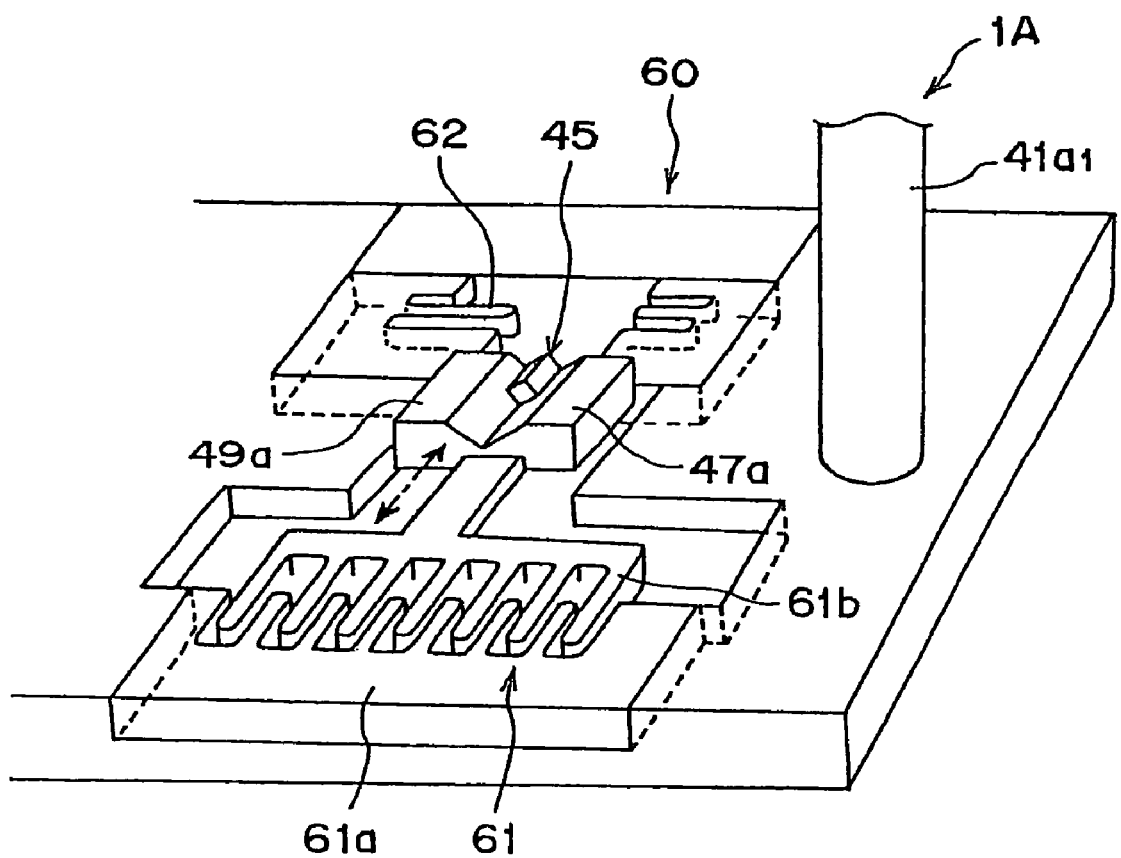
Figures 3, 4, 5, 6, 7:
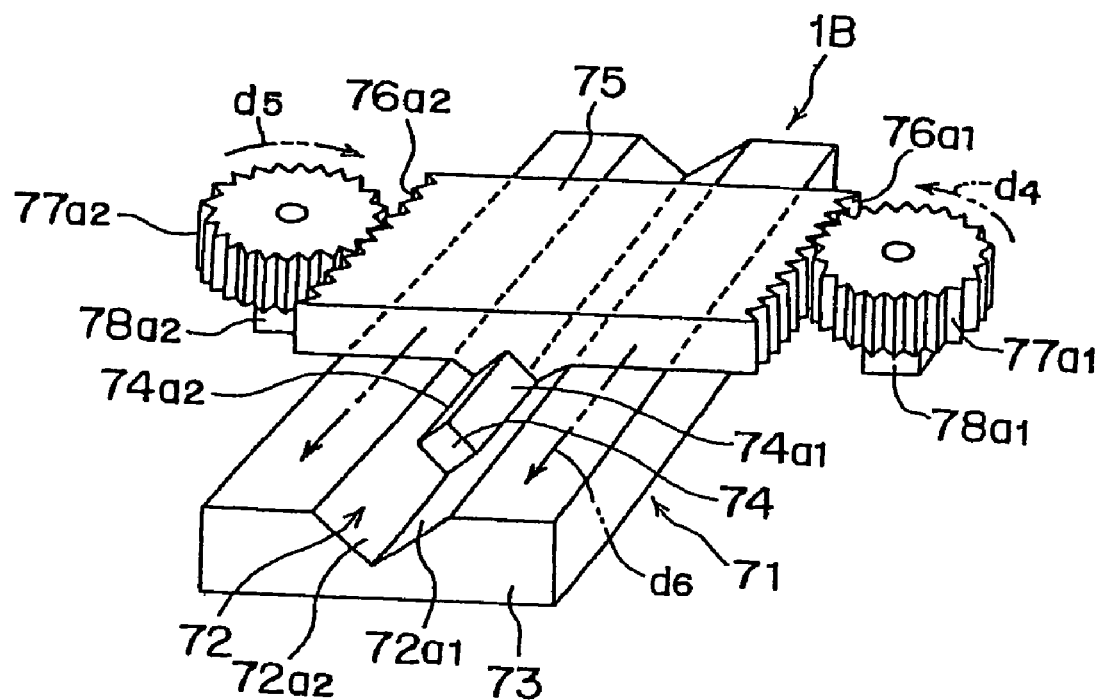
Figures 3, 4, 5, 6, 7, 8:
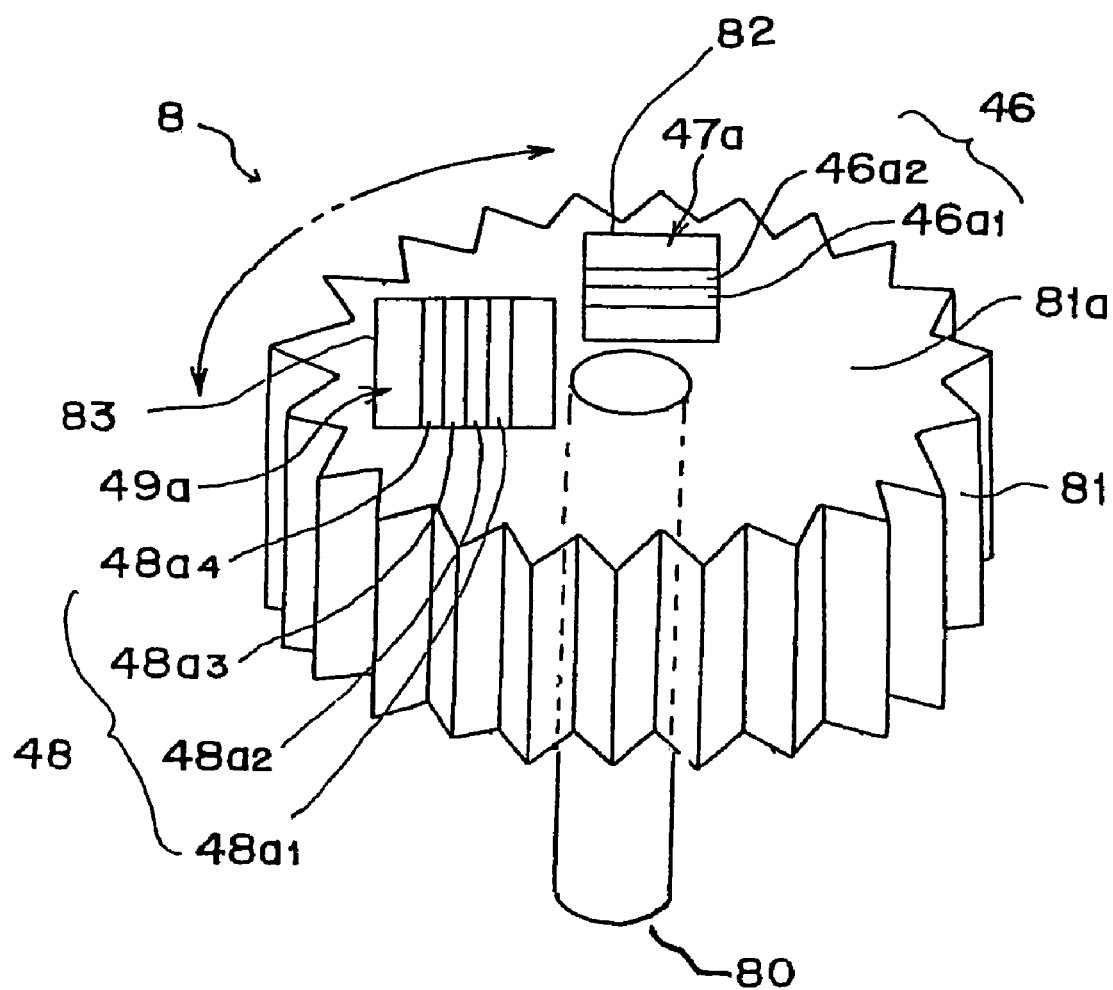

As shown in FIG. 9, the two cable holding members 102-3 sandwich the optical attenuator 105-4, and further the guide pins 112 engage in through holes 114 and insertion holes 113, whereby the cable holding members 102-3 and optical functional component 105-4 are held in condition such that transmission/reception and shield of light is accurately performed, and the effect of the clip 115 further enhances such a condition.

At this point, the reception electrodes 104 provided on the surface of the optical functional component 105-4 stick out from the cable holding member 102 to the outside, are connected to the power supply electrode 107-1 in FIGS. 2-1 to 2-6, and thus in condition as shown in FIG. 2-7.

This embodiment illustrates the case that the optical functional component is an optical attenuator. However, by providing through holes and causing a reception electrode to stick out to the outside, it is possible to use various types of optical functional components, not limiting to the optical attenuator.

Further, an existing connector based on which a cable holding means is manufactured is not limited to an MT connector, and it may be possible to use an MPO connector in which a securing clip is incorporated and MT-RJ connector.

FIG. 2-10 is a perspective view of a power supply electrode 107-2 according to the sixth embodiment of the present invention.

FIGS. 2-1 to 2-5 illustrate the case that the power supply electrode 107-1 is comprised of two bent metallic members, but the second invention is not limited to such a case. Also in the case where a power supply electrode is comprised of a single metallic member as the power supply electrode 107-2 in this embodiment, it is possible to supply power to an optical functional component with reliability and exchange the optical functional component with ease as in the power supply electrode 107-1.

FIG. 2-11 is a perspective view of a power supply electrode 107-3 according to the seventh embodiment of the present invention.

In the power supply electrodes 107-1 shown in FIGS. 2-1 to 2-5 and 107-2 shown in FIG. 2-10, as described previously, the bent structure and the elasticity of metal enables reliable power supply to an optical functional component and easy attaching/detaching of the optical functional component. Meanwhile, the power supply electrode 107-3 is provided with two metallic members (107-3a and 107-3b) and a contacting means that brings the metallic members into intimate contact with the reception electrode, and thus is capable of exerting the same effects as those of the power supply electrodes 107-1 and 107-2.

In this embodiment a spring 120 is used as the contacting means. In this way, the metallic members 107-3a and 107-3b are open and closed in the direction of an arrow A.

The power supply electrode 107-3 is coupled to a housing or protecting member using a coupling member not shown.

Further, using other materials such as a polymer material as the contacting means is capable of obtaining the same effect as the spring 120.

Furthermore, in order to ensure safety when a user exchanges optical functional components, portions with which the user comes into contact by hand can be converted with an insulating material.

In addition, in all the embodiments of the second invention, the cable holding means is provided with a collimator lens. Meanwhile, depending on the types of optical functional components, it is possible to exert an effect on light output from an optical cable without using the collimator lens, and therefore, it is possible to eliminate a collimator lens from the cable holding means.

Further, with respect to the reception electrode, while the above embodiments illustrate the case that the structural member is made of metal, a configuration may be possible in which a structural member is made of an insulating material and is provided with an electrode terminal on its surface. In this way, it is possible to use a single member as a plurality of electrodes and to supply power to a device with more complicated mechanisms.

As described above, in the second invention, a power supply device for an optical functional component is provided which has a reception electrode provided on a surface of the optical functional component, a power supply electrode that holds tight the reception electrode on its side faces, thereby maintains the optical functional component detachably at a position that enables the optical functional component to function accurately on light, and supplies power to the reception electrode, and a protecting member that surrounds the power supply electrode, thereby eliminating the need of boding and the risk of break.

According to the foregoing, it is made possible to provide a power supply device for an optical functional component that supplies power to the optical functional component with reliability for a long term and enables easy exchange of the optical functional component, and an optical functional module having such a power supply device.

Third Embodiment

Embodiments of the third invention will be described below with reference to accompanying drawings.

FIG. 3-1 is a disassembled perspective view showing a schematic configuration of an optical switch 1 according to the first embodiment of the third invention, and FIG. 3-2 is a cross-sectional view taken along the arrowed line II-II of the optical switch 1 shown in FIG. 3-1.

As shown in FIGS. 3-1 and 3-2, the optical switch 1 is provided with a connector module 2 having integrally modularized connector and receptacle.

The connector module 2 has a 4-conductor MT-RJ connector (hereinafter, simply referred to as a connector) 5 with incorporated four optical fibers (4-coductor cable; two optical fibers (4$a$1 and 4$a$3) for light-beam input and two optical fibers (4$a$2 and 4$a$4) for light-beam output) in a tape-shaped optical fiber 3, and a receptacle 7 having a hollow portion 6 in which the connector 5 engages detachably.

Examples used as each of the optical fibers 4$a$1 to 4$a$4 include a single mode optical fiber and a GI (Graded Index) fiber with a refractive index of approximately square distribution.

The connector 5 is provided with an approximately rectangle ferrule 10. The tape-shaped optical fiber 3 is inserted into a side face of the ferrule 10 through a boot portion 11, and a sheath of the fiber 3 is removed on its one end surface at a downstream side in the insertion direction in which the fiber 3 is inserted.

The four optical fibers (optical fiber conductors; 4$a$1 to 4$a$4) with the sheath is removed are secured and supported in parallel to one another along the insertion direction through four conductor guide holes formed in advance in parallel at predetermined intervals in the ferrule 10. End faces of the optical fibers 4$a$1 to 4$a$4 at the downstream side in the insertion direction are integrally formed as a connector terminal face 12 the same as one end face of the ferrule 10 at the downstream side in the insertion direction.

Further, the ferrule 10 has guide pint holes 15$a$1 and 15$a$2 formed at opposite sides each spaced a predetermined interval from the conductor guide holes, along which the holes 15$a$1 and 15$a$2 are arranged. The guide pins 15$a$1 and 15$a$2 are opened on the connector face 12.

Then, from one side face (for example, upper face in FIG. 3-1) perpendicular to the connector end face 12 of the ferrule 10, a key-shaped engaging portion 20 extends which is an RJ latch portion, i.e., which engages in the receptacle 7 to latch the connector 5 into the receptacle 7. On a front end portion of the engaging portion 20 is formed a fastening hook 21 for the latch (engaging).

The hollow portion 6 of the receptacle 7 has an opening face 25 of size corresponding to the connector end face 12, and has a shape corresponding to the ferrule 10. The ferrule 10 is inserted into the hollow portion 6 through the opening face 25, and thus engages in the hollow portion 5.

The receptacle 7 is provided with an engaging hole 26 formed, along the direction in which the ferrule is inserted, from a position opposed to the key-shaped engaging portion 20 in such a condition that the connector 5 is placed in order for the connector end terminal 12 to oppose to the one end face 25 of the hollow portion 6.

The receptacle 7 is further provided with a fastening hole 27 to which the fastening hook 21 engages on its one side face (for example, upper face in FIG. 3-1) corresponding to the side in which another end portion of the engaging hole 26 and key-shaped engaging portion are formed.

The receptacle 7 is furthermore provided with an open/close shutter 28 attached to part of a limb composing the opening face 25 to be pivotable about the part of the limb. The open/close shutter 28 closes the opening face 25 at a normal time (any external force is not acted), while opening the opening face 25 corresponding to insertion of the connector 5.

The optical switch 1 is further provided with a lens connector 31 having incorporated collimator lenses 30$a$1 to 30$a$4 corresponding to a number (4) of optical fibers (fiber conductors) of the connector 5.

The lens connector 31 is provided with a plate-shaped lens housing 32 having a cross section (in the direction perpendicular to the optical fiber axis) with the same shape and area as those of the connector end face 12 of the ferrule 10 and of the opening face 25 of the receptacle 7.

Each of the collimator lenses 30$a$1 to 30$a$4 has the same size as that of a fiber diameter (conductor diameter). Anti-reflection coating is applied to opposite end surfaces of each of collimator lenses 30$a$1 to 30$a$4.

The collimator lenses 30$a$1 to 30$a$4 are held so as to oppose to and spaced a predetermined distance from optical fibers 4$a$1 to 4$a$4 when a one end face 33 of the lens housing 32 is opposed to and in intimate contact with the connector end face 12 of the ferrule 10.

In the lens housing 32, at opposite ends each spaced a predetermined distance from collimator lenses 30$a$1 and 30$a$4 at outer sides, guide pin holes 35$a$1 and 35$a$2 are disposed along the axis line of the collimator lenses 30$a$1 and 30$a$4 to penetrate the housing 32.

As examples of properties of each of the collimator lenses 30$a$1 to 30$a$4, the lenses are set at about 70 μm in spot diameter and about 1.0 mm in operation length.

The optical switch 1 is provided with a plate-shaped reflecting member 40 that is accommodated in the hollow portion 6 of the receptacle 7 and attached to the bottom of the hollow portion 6. On the reflecting member 40, guide pins 41$a$1 and 41$a$2 extend along the direction in which the connector is inserted from positions opposite to the guide pin holes 35$a$1 and 35$a$2 in such a condition that the lens connector 31 is placed so that the other end face 36 is opposed to the opening face 25 of the receptacle 7, respectively.

The guide pin 41$a$1 or 41$a$2 has the same diameter as corresponding guide pin holes 15$a$1 and 15$a$2 or 35$a$1 and 35$a$2, respectively. In other words, when the lens connector 31 engages in the hollow portion 6 of the receptacle 7, the guide pings 41a1 and 41a2 pass through the guide pin holes 35a1 and 35a2 of the lens connector 31 and thus support the lens connector 31.

Further when the connector 5 engages in the hollow portion 6 of the receptacle 7 opposite to the lens connector 3, the guide pings 41a1 and 41a2 pass through the guide pin holes 15a1 and 15a2 of the connector 5 and thus support the connector 5.

As shown in FIGS. 3-2 to 3-4, the reflecting member 40 is provided with a reflecting portion 45 disposed at a position opposite to the optical fibers 4a1 to 4a4 (optical paths of their light beams) when the connector end face 12 of the ferrule 10 of the connector 5 engages in the hollow portion 6 of the receptacle 7 via the lens connector 31.

As shown in FIG. 3-4, the reflecting portion 45 is provided with a V-shaped reflector 47 having a V-shaped groove 46 engraved along a plane opposite to the optical paths of the optical fibers 4a1 to 4a4 and in the direction perpendicular to the direction in which the optical fibers are arranged, and a W-shaped reflector 49 having a W-shaped groove 48 engraved along a plane opposite to the optical paths of the optical fibers 4a1 to 4a4 and in the direction perpendicular the direction in which the optical fibers are arranged.

The V-shaped reflector 47 and W-shaped reflector 49 have approximately the same plate thickness and width. The whole groove width of the W-shaped groove 48 (length between the most outer limbs on opposite ends of the W-shaped groove 48) of the W-shaped reflector 49 is the same as the groove width of the V-shaped groove 46, and the V-shaped reflector 47 and W-shaped reflector 49 are incorporated so that the V-shaped groove 46 and W-shaped groove are connected continuously.

The V-shaped groove 46 has a first inner surface 46a1 opposite to optical paths of the input optical fiber 4a1 and output optical path 4a2, and a second inner surface 46a2 which is adjacent at a 90-degree interior angle to the first inner surface 46a1 along the direction the optical fibers are arranged, and is opposite to optical paths of the input optical fiber 4a3 and output optical fiber 4a4.

The boundary line between the first inner surface 46a1 and second inner surface 46a2 is positioned on a center line extending through the center point of the other end face 36 of the lens connector 31 and the center point of the connector face 12 of the connector 5, in the direction perpendicular to the center line and to the direction in which the fibers are arranged. The first and second inner surfaces 46a1 and 46a2 are line symmetry with respect to the boundary line.

The W-shaped groove 48 has third to sixth inner surfaces 48a1 to 48a4 adjacent to one another at an interior degree of 90° sequentially. The first inner surface 46a1 of the V-shaped groove 46 is connected continuously with the third inner surface 48a1 of the W-shaped groove 48, while the second inner surface 46a2 of the V-shaped groove 46 is connected continuously with the sixth inner surface 48a4 of the W-shaped groove 48.

As shown in FIG. 3-4, the reflecting portion 40 is provided with rack gears 51a1 and 51a2 provided at opposite sides along the groove direction of the incorporated V-shaped reflector 47 and W-shaped reflector 49.

The reflecting portion 40 is further provided with pinion gears 51a1 and 51a2 that respectively engage the rack gears 50a1 and 50a2, and rotation driving portions 52a1 and 52a2 that are coupled to axes of the pinion gears 51a1 and 51a2 and drive the pinion gears 51a1 and 51a2 to rotate corresponding to the supplied power, respectively. A moving mechanism 53 is composed of the rack gears 50a1 and 50a2, pinion gears 51a1 and 51a2 and rotation driving portions 52a1 and 52a2.

Meanwhile, further provided are an electrode 55 that penetrates the side face opposite to the opening face 25 of the receptacle 7 and a power supply connected to the electrode 55, not shown. The power is supplied to the rotation driving portions 52a1 and 52a2 through the electrode 55.

Assembly and operation of the optical switch 1 according to this embodiment will be described below.

As shown in FIGS. 3-1 to 3-3, in assembling the optical switch 1, the lens unit 31 is placed in order for the other end face 36 to oppose to the opening face 25 of the receptacle 7. Then, the lens connector 31 is inserted into the hollow portion 6 through the opening face 25.

At this time, since the open/close shutter 28 closing the opening face 25 is pivotable, the open/close shutter 28 is pressed by inserting the lens connector 31, and swings inside the hollow portion 6. As a result, the opening face 25 is opened, and thus inserting the lens connector 31 makes the open/close shutter 28 self-opened.

The inserted lens connector 31 is engaged in a position that brings the connector 31 into contact with the reflecting member 40 in the hollow portion 6. At this point, the guide pings 41a1 and 41a2 of the reflecting member 40 are inserted into the guide pin holes 35a1 and 35a2 of the lens connector 31, and thus the lens connector 31 is integrally attached to the reflecting member 40.

When the engaging and attaching of the lens connector 31 to the receptacle 7 is finished, since the pressure of pressing the open/close shutter 28 disappears, the open/close shutter is self-closed.

Next, the connector 5 is placed in order for the connector end face 12 to oppose to the opening face 25 of the receptacle 7. Then, the ferrule 10 of the connector 5 is inserted into the hollow portion 6 through the opening face 25. At this point, as in the lens connector 31, only inserting the connector 5 makes the open/close shutter 28 self-opened.

The ferrule 10 of the inserted connector 5 is engaged in the hollow portion 6, and the connector end face 12 is brought into face-contact with the one end face 33 of the lens connector 31. At this point, the guide pings 41a1 and 41a2 of the reflecting member 40 are inserted into the guide pin holes 15a1 and 15a2 of the connector 5, and thus the ferrule 10 of connector 5 is integrally attached to the reflecting member 40.

Corresponding to the insertion of the connector 5, the engaging portion 20 of the connector 5 engages in the engaging hole 26 of the receptacle 7. When the ferrule 10 is engaged in a position that brings the connector end face 12 of the connector 5 into face-contact with the one end face 33 of the lens connector 31, the fastening hook 21 of the engaging portion 20 is fastened to the fastening hole 27 of the receptacle 7. As a result, the connector 5 is latched to the receptacle 7.

In this way, it is possible to assemble the optical switch 1 composed of integrally combined the receptacle 7 having the reflecting member 40, and a fiber collimator composed of integrally combined the optical fibers 4a1 to 4a4 of the connector 5 and collimator lenses 30a1 to 30a4 of the lens connector 31.

Thus, in this embodiment, it is possible to engage the lens connector 31 and connector 5 in the hollow portion 6 of the receptacle 7 with their positions accurately aligned by the guide pin holes 35a1, 35a2, 15a1 and 15a2 and guide pins 41a1 and 41a2.

In other words, by using the guide pin holes 35a1, 35a2, 15a1 and 15a2 and guide pins 41a1 and 41a2, it is possible to precisely match the fiber axes of the optical fibers 4a1 to 4a4 with the center axes of the collimator lenses 30a1 to 30a4 of the lens connector 31, respectively.

Further, it is possible to cause the input optical fiber 4a1 and output optical fiber 4a2 to precisely oppose to the inner surface 46a1 of the reflecting member 40. Furthermore, it is possible to cause the input optical fiber 4a3 and output optical fiber 4a4 to precisely oppose to the inner surface 46a1 of the reflecting member 40.

The optical switching (optical path switching) of thus assembled optical switch 1 will be described next.

When light beams c1 and c2 are input through the input optical fibers 4a1 and 4a3 of the connector 5, the light beams c1 and c2 are transformed into collimated light beams (parallel light beam) through the collimate lenses 30a1 and 30a2. The transformed light beams c1 and c2 are respectively incident on the inner surfaces 46a1 and 46a2 of the V-shaped groove 46 of the V-shaped reflector 47.

At this point, as shown in FIG. 3-5A, since the inner surfaces 46a1 and 46a2 are adjacent to each other at a 90-degree angle, the light beam c1 incident on the inner surface 46a1 is reflected by the inner surface 46a1 and incident on the inner surface 46a2. The light beam c1 is further reflected by the inner 46a2 and output as a reflected beam r1 in parallel and opposite traveling direction to the light beam c1.

The output reflected beam r1 is condensed through the corresponding collimator lens 30a4, and output through the output optical fiber 4a4.

Similarly, the light beam c2 incident on the inner surface 46a2 is reflected by the inner surfaces 46a2 and 46a1 sequentially, and output as a reflected beam r2 in parallel and opposite traveling direction to the light beam c2. The output reflected beam r2 is output through the corresponding collimator lens 30a2, and further output through the output optical fiber 4a2.

Next, as the optical switching (optical path switching) function of the optical switch 1, a case will be described where output optical paths of the light beams c1 and c2 input through the input optical fibers 4a1 and 4a3 are switched from the output optical fibers 4a4 and 4a2 to the output optical fibers 4a2 to 4a4, respectively.

First, the power is supplied to the rotation driving portions 52a1 and 52a2 of the moving mechanism 53 through the electrode 55, thereby operates the rotation driving portions 52a1 and 52a2, and as shown in FIG. 3-5B, the pinion gears 51a1 and 51a2 are rotated in directions d1 and d2 shown by two-dot-dash line arrows in the figure, respectively.

As a result, the incorporated reflectors 47 and 49 provided with rack gears 50a1 and 50a2 engaging the pinion gears 51a1 and 51a2 move along the boundary line direction (direction d3 shown by the two-dot-dash line arrow), according to the rotation of the pinion gears 51a1 and 51a2. Thus, as shown in FIG. 3-5, the W-shaped groove 48 is placed opposite to the input and output optical fibers 4a1 to 4a4.

In other words, the input optical fibers 4a 1 and 4a3 are opposite to the third inner surface 48a1 and fifth inner surface 48a3 respectively, while the input optical fibers 4a2 and 4a4 are opposite to the fourth inner surface 48a2 and sixth inner surface 48a4 respectively.

Under this condition, collimated light beams c1 and c2 are reflectively incident on inner surfaces 48a 1 and 48a3 of the W-shaped groove of the W-shaped reflector 49.

At this point, as shown in FIG. 3-5B, since the inner surfaces 48a1 and 48a2 are adjacent to each other at a 90-degree angle, the light beam c1 incident on the inner surface 48a1 is reflected by the inner surfaces 48a1 and 48a2 sequentially, and output as a reflected beam r1 in parallel and opposite traveling direction to the light beam c1. The output reflected beam r1 is condensed through the corresponding collimator lens 30a2, and output through the output optical fiber 4a2.

Similarly, the light beam c2 incident on the inner surface 48a3 is reflected by the inner surfaces 48a3 and 48a4 sequentially, and output as a reflected beam r2 in parallel and opposite traveling direction to the light beam c2. The output reflected beam r2 is output through the corresponding collimator lens 30a4, and further output through the output optical fiber 4a4.

In other words, in this embodiment, the incorporated reflectors 47 and 49 are moved using the moving mechanism 53, and grooves that reflect light beams in the direction opposite to the input optical paths are switched between the V-shaped groove 46 and W-shaped groove 48, whereby it is possible to implement the 2×2 optical switching function (optical path switching function) with greatly ease.

As described above, according to this embodiment, the optical switch 1 is composed using the ferrule 10 in advance incorporating and securing the light-beam input optical fibers 4a1 and 4a3 and light-beam output optical fibers 4a2 and 4a4, and the connector 5 such as an MT-RJ connector that has the receptacle 7 capable of engaging the ferrule 10.

Therefore, the lens connector 31 for condensing input and output light beams and the reflecting member 40 for reflecting the input light beams while switching the output paths are accommodated in the receptacle 7, and the ferrule 10 is engaged in the receptacle 7, whereby it is possible to integrally combine the optical fibers 4a1 to 4a4, lens connector 31 and reflecting member 40 readily.

Then, by inserting the guide pins 41a1 and 41a2 of the reflecting member 40 respectively into the guide pin holes 15a1 and 15a2 formed in advance in the connector 5, and the guide pin holes 35a1 and 35a2 formed in advance in the lens connector 31, it is possible to perform the alignment that precisely aligns in the same axes respectively the center axes of the optical fibers 4a1 to 4a4 of the connector 5, collimator lenses 30a1 to 30a4 of the lens connector 31 and the V-shaped groove 46 (or W-shaped groove 48) in the reflectors 47 and 46 of the reflecting member 40.

Accordingly, without securing the optical fibers 4a1 to 4a4 using V-shaped grooves, covers and so on, only by engaging the lens connector 31 and ferrule 10 in the receptacle 7, the optical switch 1 can be provided in which the connector 5, lens connector 31 and reflecting member 40 are precisely aligned. Therefore, it is possible to eliminate or greatly reduce the need of complicated alignment in the assembly of the optical switch, and to simplify the assembly of the optical switch.

Further, according to this embodiment, the incident light beam is reflected using the reflecting member 40 with the V-shaped groove 46 and W-shaped groove 48, and is output in parallel and opposite direction to the incident optical path. It is thereby possible to arrange the input and output optical fibers 4a1 to 4a4 in parallel to one another in a predetermined direction.

In other words, as compared to a conventional optical switch in which, for example, input and output optical paths such as optical fiber are arranged in four directions around a mirror or the like, it is possible to make the entire size greatly compact.

In particular, in a configuration where input and output optical paths such as optical fiber are arranged in four directions around a switch, it is required to reserve the area needed to cope with the fibers on a circuit board on which the switch module is mounted, resulting in a degraded efficiency in circuit board packaging.

On the contrary, according to this embodiment, since the light-beam input and output optical fibers 4a1 to 4a4 can be arranged in parallel to one another in a predetermined direction, it is possible to reduce the occupied area on the circuit board on which the switch 1 is mounted while making the switch 1 compact in size, enabling an improved efficiency in circuit board packaging.

Further, in this embodiment, since the lens connector 31 is used, as an input output light-beam collimator, which has an integrally-formed collimator lenses 30a1 to 30a4 corresponding to input and output optical fibers 4a1 to 4a4, as compared to the case of using fiber collimators (GI fiber) due to fusion-splicing, it is possible to prevent the occurrence of fluctuation associated with the refractive index of the fiber, and suppress the coupling loss to a low extent. As a result, it is possible to improve the practicality of the optical switch 1.

In particular, in this embodiment, using the lens collimator 31 makes it possible to align the connector end face 12 containing the optical fibers 4a1 to 4a4 with the one end face 33 of the lens connector 31 with ease and with accuracy. It is thus possible to suppress the coupling loss value without performing specialized processing.

Further, in this embodiment, the receptacle 7 is capable of accommodating therein integrally-formed the reflecting member 40 including the reflectors 47 and 49 having the V-shaped groove 47 and W-shaped groove 48, and the moving mechanism 53 that moves the reflectors 47 and 49. Therefore, the need is eliminated of installing a reflecting-member moving device such as a permanent magnet or electromagnet outside the switch, and the size of the optical switch 1 is made further compact.

In particular, in this embodiment, since the MT-RJ connector 2 is applied to compose the optical switch 1, it is possible to provide a module (receptacle 7 incorporating and accommodating the lens connector and reflecting member 40) with no connector 5 that secures the optical fibers 4a1 to 4a4 to a user as an optical switch module, for example. In this case, with respect to the provided optical switch module, the user inserts and engages an MT-RJ connector into the optical switch module (receptacle 7) to operate as a 2×2 optical switch 1.

In other words, it is general in the conventional optical component that optical fibers stick out from part of the module, and the user needs to connect the optical fibers of the module to optical fibers at a user side.

However, in the optical switch module applying the optical switch 1 of this embodiment that allows retrofitting of a connector, even an unsophisticated user is capable of assembling the optical switch 1 only by inserting the MT-RJ connector into the optical switch module.

Thus, the handling of the optical switch 1 at a user side is facilitated. Further, in a field having the MT-RJ connector, it is possible to assemble a 2×2 optical switch in the field.

In this embodiment, exchanging the lens connector 31 enables properties of the collimator to be variable. Further, for example, when a case arises that inconveniences only occur on the reflecting member 40, it is not required to exchange the lens connector 31 (collimator). In other words, it is only required to exchange the receptacle 7 in which the reflecting member 40 is accommodated, and the lens connector 31 (collimator) can be used continuously.

As a matter common to conventional optical switches as described above, there has been the problem that after assembling the optical switch module, it is impossible to modify its function or use part of the function (structural element) in another module without providing any effect on the switch. For example, after forming the optical switch module using GI fibers, it is not possible to remove only the GI fibers from the optical switch module to use in another optical component. In other words, when inconveniences occur on the reflecting member such as a mirror, despite the other structural elements functioning normally, these elements are also abandoned.

However, according to this embodiment, when inconveniences occur on either one of the connector 5, lens connector 31 and receptacle 7 accommodating the reflecting member 40, it is only required to exchange a structural element with the inconveniences occurring thereon. Further, it is possible to use a normal structural element in another optical switch module.

Moreover, in this embodiment, in the insertion and removing of the connector 5 (lens connector 31) into/from the receptacle 7, the open/close shutter 28 is provided that that automatically opens and closes the opening face 25 of the hollow portion 6 of the receptacle 7 by the insertion and removing operations. Therefore, the opening face 25 of the receptacle 7 is closed to interrupt the inside of the housing from the outside air except the time the connector 5 is inserted (engages in the receptacle), thereby avoiding the effect of the outside air on the housing.

As properties of the collimator lenses 30a1 to 30a4 in this embodiment, since it is designed that a spot diameter is set at 70 μm, and operation distance is set at 1.0 mm, it is possible to output approximately collimated light beams through the collimator lenses 30a1 to 30a4. In other words, in this embodiment, whether to reflect the input light beam by the V-shaped groove or the W-shaped groove causes an optical path difference of maximum 500 μm in the optical path length of the reflected light beam.

Then, in this embodiment, in order to increase a tolerance of axis deviation in the optical axis direction of the collimator lenses 30a1 to 30a4, the light beams input and output through the input optical fibers 4a1 to 4a4 are set to collimated light beams.

As a result, an insertion loss of 0.2 dB is caused for the operation length of 1.0 mm, and the tolerance of the axis deviation in the optical axis direction for the insertion loss becomes, for example, enormously large, for example, 800 μm. In other words, even though the operation length shifts from 1.0 mm to 0.2 mm or 1.8 mm, the insertion loss can be suppressed within 0.2 dB.

Second Embodiment

The optical switch 1A of this embodiment is different from the optical switch 1 shown in FIGS. 3-1 to 3-5B in the first embodiment only in a configuration of the reflecting member. Therefore, the reflecting member will be only described with other descriptions omitted.

FIG. 3-6 is a view showing a reflecting member 60 in the optical switch 1A of this embodiment. In addition, the same structural elements as those of the reflecting member 40 shown in FIG. 3-5 are assigned the same reference numerals to omit or simplify the descriptions.

As shown in FIG. 3-6, the reflecting member 60 of the optical switch 1A is formed from silicon etching, replacing the moving mechanism 53 (rack gears 50a1 and 50a2, pinion gears 51a1 and 51a2 and rotation driving portions 52a1 and 52a2), and is provided with a comb-shaped comb drive actuator 61 capable of moving a movable electrode by static electricity, and a spring 62.

The comb drive actuator 61 is disposed at one side along the boundary line between the first inner surface 46a1 and second inner surface 46a2 in the reflecting member 60. The spring 62 as force-applying member is disposed at the other side along the boundary. The spring 62 is connected to an end face along the boundary line between incorporated reflectors 47a and 49a, and forces the incorporated reflectors 47a and 49a against the comb drive side along the boundary line.

Meanwhile, the comb drive actuator 61 generates the static electricity on the comb-shaped fixed electrode 61a, moves the comb-shaped variable electrode 61b to a side of the spring 62 along the boundary by the static electricity, and thus presses the incorporated reflectors 47a and 49a against the side of the spring 62.

In other words, according to this embodiment, when the balance is kept between the pressing force of the variable electrode 61b acting on the incorporated reflectors 47a and 49a towards the side of the spring 62 based on the static electricity generated from the comb drive actuator 61, and the force of the spring 62 acting on the incorporated reflectors 47a and 49a, the incorporated reflectors 47a and 49a do not move.

For example, when the inner surfaces 46a1 and 46a2 of the V-shaped groove 46 of the reflector 47a are opposed to the input optical fibers 4a1 and 4a3, as in the first embodiment, light beams c1 and c2 incident through the input optical fibers 4a1 and 4a3 are reflected by the inner surfaces 46a1→46a2 and 46a2→46a1 of the V-shaped groove, and output to the output optical fibers 4a4 and 4a2, respectively.

Then, when switching optical paths, the static electricity of the comb drive actuator 61 is adjusted in order for the force of the spring 42 to be greater than the pressing force of the variable electrode 61b based on the static electricity of the comb drive actuator 61. As a result, by the force of the spring 42, the incorporated reflectors 47a and 49a move towards the side of the comb drive actuator, and the inner surfaces 48a1 and 48a2 of the W-shaped groove are opposite to the input optical fibers 4a1 and 4a3.

Thereafter, in the same way as in the first embodiment, light beams c1 and c2 incident through the input optical fibers 4a1 and 4a3 are reflected by the inner surfaces 48a1→48a2 and 48a3→48a4 of the W-shaped groove, and output to the output optical fibers 4a2 and 4a4, respectively.

As described above, according to this embodiment, the static electricity of the comb drive actuator 61 is adjusted corresponding to the force of the spring 42 to move the incorporated reflectors 47a and 49a, and it is thus possible to switch grooves that reflect light beams opposite the incident optical paths between the V-shaped groove 46 and W-shaped groove 48. As a result, it is possible to obtain the same effects as in the first embodiment such that 2×2 optical path switching function can be achieved with ease.

Third Embodiment

The optical switch 1B of this embodiment is different from the optical switch 1 shown in FIGS. 3-1 to 3-5B in the first embodiment only in a configuration of a reflecting portion of the reflecting member. Therefore, the reflecting portion will be only described with other descriptions omitted.

FIG. 3-7 is a view showing a reflecting portion 71 of the reflecting member in the optical switch 1B of this embodiment. In addition, the same structural elements as those of the reflecting portion 45 shown in FIG. 3-4 are assigned the same reference numerals to omit or simplify the descriptions. The reflecting member of this embodiment is also produced precisely using the semiconductor production technology.

As shown in FIG. 3-7, the reflecting portion 71 is provided with a V-shaped reflector 73 having a V-shaped groove 72 engraved along a plane opposite to the optical paths of the optical fibers 4a1 to 4a4 and in the direction perpendicular to the direction in which the optical fibers are arranged, and a prism member 74 that engages in the V-shaped groove 72 of the V-shaped reflector 73.

The V-shaped groove 72 is approximately the same as the V-shaped groove 46 in the first embodiment, and has a first inner surface 72a1 opposite to optical paths of the input optical fiber 4a1 and output optical path 4a2, and a second inner surface 72a2 which is adjacent at a 90-degree interior angle to the first inner surface 72a1 along the direction the optical fibers are arranged, and is opposite to optical paths of the input optical fiber 4a3 and output optical fiber 4a4.

The prism member 74 is movable along the boundary direction of the V-shaped groove 72, and has first and second outer surfaces 74a1 and 74a2 adjacent respectively at a 90-degree interior angle to the first and second inner surfaces 72a1 and 72a2 of the V-shaped groove 72.

Then, as shown in FIG. 3-7, the reflecting portion 71 is further provided with a moving plate 75 that is movable on the V-shaped reflector 73 along the groove direction and coupled to the prism member 74, rack gears 76a1 and 76a2 respectively provided on opposite side faces of the moving plate 75 along the direction in which the plate 65 moves, pinion gears 77a1 and 77a2 respectively engaging the rack gears 76a1 and 76a2, and rotation driving portions 78a1 and 78a2 which are coupled to axes of the pinion gears 77a1 and 77a2, and drive the pinion gears 77a1 and 77a2 to rotate corresponding to the supplied power, respectively. A moving mechanism 79 is composed of the rack gears 76a1 and 76a2, pinion gears 77a1 and 77a2 and rotation driving portions 78a1 and 78a2.

According to this configuration, when the inner surfaces 72a1 and 72a2 of the V-shaped groove 72 of the V-shaped reflector 73 are opposed to the input optical fibers 4a1 and 4a3, as in the first embodiment, light beams c1 and c2 incident through the input optical fibers 4a1 and 4a3 are reflected by the inner surfaces 72a1→72a2 and 72a2→72a1 of the V-shaped groove, and output to the output optical fibers 4a4 and 4a2, respectively.

Then, when switching optical paths, the power is supplied to the rotation driving portions 78a1 and 78a2 through the electrode 55, thereby operates the rotation driving portions 78a1 and 78a2, and as shown in the figure, the pinion gears 77a1 and 77a2 are rotated in directions d4 and d5 shown by two-dot-dash line arrows in the figure, respectively.

As a result, the moving plate 75 with therein formed rack gears 76a1 and 76a2 engaging the pinion gears 77a1 and 77a2 moves along the V-shaped groove 72 (direction d6 shown by the two-dot-dash line arrow) as well as the prism member 74, according to the rotation of the pinion gears 77a1 and 77a2.

Then, the prism member 74 moves via the moving plate 75 to a position in which the first outer surface 74a1 is opposite to the output optical fiber 4a2, while the second outer surface 74a2 is opposite to the input optical fiber 4a3.

Under this condition, light beams c1 and c2 incident through the input optical fibers 4a1 and 4a3 are reflected by V-shaped groove inner surface 72a1→prism member outer surface 74a1 and prism member outer surface 74a2→V-shaped groove inner surface 72a2, and output to the output optical fibers 4a2 and 4a4, respectively.

As described above, according to this embodiment, the moving plate 75 and the prism member 74 are moved using the moving mechanism 79, and the prism member 74 is loaded and unloaded on the optical paths of the output optical fiber 4a2 and input optical fiber 4a3, whereby it is possible to switch surfaces reflecting the light beam opposite the input optical path. As a result, it is possible to obtain the same effects as in the first embodiment such that 2×2 optical path switching function can be achieved with ease.

In addition, in this embodiment, the moving mechanism including rack gears and pinion gears is used as a mechanism that moves the moving plate 75 and prism member 74, but the third invention is not limited to such a mechanism. It may be possible to use another moving mechanism including a comb drive actuator and spring as illustrated in the second embodiment, for example.

Fourth Embodiment

The optical switch 1C of this embodiment is different from the optical switch 1 shown in FIGS. 3-1 to 3-5B in the first embodiment only in a configuration of a reflecting portion of the reflecting member. Therefore, the reflecting portion will be only described with other descriptions omitted.

FIG. 3-8 is a view showing reflectors 82 and 83 in the reflecting portion of the reflecting member 8 in the optical switch 1C of this embodiment. In addition, the same structural elements as those of the reflecting portion 45 shown in FIG. 3-5 are assigned the same reference numerals to omit or simplify the descriptions.

The reflectors 82 and 83 are provided with a rotatable gear portion 81 with its rotation axis disposed along optical paths of the optical fibers 4a1 to 4a4. The reflectors 82 and 83 are respectively V-shaped reflector 82 which is provided on a face 81a opposite to the optical paths of the optical fibers 4a1 to 4a4 of the gear portion 81 and has a V-shaped groove 46, and W-shaped reflector 83 which is, on the face 81a, spaced a predetermined distance apart from the V-shaped reflector 82 and has a W-shaped groove 48.

The reflectors 82 and 83 rotate about a rotation driving portion 80 that drives the gear portion 81 to rotate.

In the same way as in the first embodiment, under the condition that the V-shaped reflector 82 is placed on the input and output optical paths, the V-shaped groove 46 has a first inner surface 46a1 opposite to optical paths of the input optical fiber 4a1 and output optical path 4a2, and a second inner surface 46a2 which is adjacent at a 90-degree interior angle to the first inner surface 46a1 along the direction the optical fibers are arranged, and is opposite to optical paths of the input optical fiber 4a3 and output optical fiber 4a4.

Further, under the condition that the W-shaped reflector 83 is placed on the input and output optical paths, the W-shaped groove 48 is provided with a third inner surface 48a1 opposite to the input optical fiber 4a1, fourth inner surface 48a2 opposite to the output optical path 4a2, fifth inner surface 48a3 opposite to the input optical fiber 4a3, and sixth inner surface 48a4 opposite to the output optical fiber 4a4 where the third to sixth inner surfaces 48a1 to 48a4 are adjacent to one another sequentially each at a 90-degree interior degree.

In other words, also in this embodiment, as in the first embodiment, by rotating the gear portion 81 via the rotation driving portion 80, it is possible to switch grooves that reflect the light beam opposite the input optical path between the V-shaped groove 46 and W-shaped groove 48. As a result, it is possible to obtain the same effects as in the first embodiment such that 2×2 optical path switching function can be achieved with ease.

The above-mentioned embodiments are only examples of embodiments of the third invention, and the scope of the third invention is not limited to the embodiments, and allows various modifications.

In other words, while the first to fourth embodiments describe a 2×2 optical switch with two input light beams and two output light beams, the third invention is not limited to such an optical switch, and is applicable similarly to an n×n (n is an integer more than or equal to 2).

In addition, while in the first to fourth embodiments reflectors are plate-shaped members, the reflectors may have desirable shapes.

While in the first to fourth embodiments, a four-conductor MT-RJ connector is used as a connector, other connectors are available as a matter of course.

Further, in the first to fourth embodiments, the semiconductor production technology is used to produce the reflecting member, but the third invention is not limited to such a technology. For example, in the precision machine industry that manufactures, for example, wristwatches, since similar micro parts (such that rack gear and pinion gear) are generally manufactured, it is possible to produce the reflecting member using such a mature existing technique with high reliability.

Further, in the first to fourth embodiments, guide pins 41a1 and 41a2 are attached to the reflecting member 40, but the third invention is not limited to the foregoing; it may be possible to form guide pin holes at positions where the guide pings are provided in the reflecting member 40, and to pass the guide pins 41a1 and 41a2 through the guide pin holes 15a1 and 15a2 of the connector 5, guide pin holes 35a1 and 35a2 of the lens connector 31, and guide pin holes of the reflecting member 40 respectively to align.

As described above, according to optical switches of the third invention, a connector module incorporated in advance with a plurality of light-beam input optical paths and light-beam output optical paths accommodates a light-beam reflecting member having the function of switching light-beam optical paths, and the aligning means aligns the connector module with the light-beam reflecting member.

Thus, the need is eliminated of securing the plurality of light-beam input optical paths and light-beam output optical paths, and it is thereby possible to facilitate the assembly of optical switch.

Further, it is possible to handle a connector module which is modularized to have a plurality of light-beam input optical paths and light-beam output optical paths, without handling the plurality of light-beam input optical paths and output optical paths such as optical fibers, thus enabling improved performance in handling the optical switch.

Furthermore, since it is possible to align the connector module with the reflecting member, it is possible to eliminate or greatly reduce the need of complicated alignment in the assembly of the optical switch, and to simplify the assembly of the optical switch.

Moreover, the connector module accommodates a light-beam reflecting member having the function of switching light-beam optical paths, and therefore, the need is eliminated of installing a reflecting-member moving device such as a permanent magnet or electromagnet outside the switch, and the size of the optical switch is made further compact.

What is claimed is:

1. An optical functional module comprising:
   (a) at least one cable holding member that holds an optical fiber;
   (b) an optical functional component that exerts a predetermined effect on light;
   (c) a power supply device for said optical functional component provided with a reception electrode provided on a surface of said optical functional component and a power supply electrode that supplies power to said reception electrode while holding tight said reception electrode on its side faces and thereby holding said optical functional component detachably; and
   (d) a housing that secures said cable holding means and said power supply electrode;
   wherein said power supply electrode is provided with two bent metallic members which are in intimate contact with said reception electrode by elasticity.

2. An optical functional module comprising:
   (a) at least one cable holding member that holds an optical fiber;
   (b) an optical functional component that exerts a predetermined effect on light;
   (c) a power supply device for said optical functional component provided with a reception electrode provided on a surface of said optical functional component and a power supply electrode that supplies power to said reception electrode while holding tight said reception electrode on its side faces and thereby holding said optical functional component detachably; and
   (d) a housing that secures said cable holding means and said power supply electrode;
   wherein said power supply electrode is provided with a bent metallic member which is in intimate contact with said reception electrode by elasticity.

3. An optical functional module comprising:
   (a) at least one cable holding member that holds an optical fiber;
   (b) an optical functional component that exerts a predetermined effect on light;
   (c) a power supply device for said optical functional component provided with a reception electrode provided on a surface of said optical functional component and a power supply electrode that supplies power to said reception electrode while holding tight said reception electrode on its side faces and thereby holding said optical functional component detachably; and
   (d) a housing that secures said cable holding means and said power supply electrode;
   wherein said power supply electrode is provided with two metallic members and contacting means for bringing the two metallic members into intimate contact with said reception electrode.

4. The optical functional module of claim 3, wherein said contacting means is a spring.

* * * * *